(12) United States Patent
Cho

(10) Patent No.: US 8,023,054 B2
(45) Date of Patent: Sep. 20, 2011

(54) FLAT PANEL DISPLAY AND FABRICATING METHOD THEREOF

(75) Inventor: Suk Ho Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 806 days.

(21) Appl. No.: 11/391,511

(22) Filed: Mar. 29, 2006

(65) Prior Publication Data

US 2007/0165180 A1    Jul. 19, 2007

(30) Foreign Application Priority Data

Dec. 30, 2005    (KR) .................. 10-2005-0135046

(51) Int. Cl.
*G02F 1/136*    (2006.01)
(52) U.S. Cl. .......................................... 349/43; 349/46
(58) Field of Classification Search .................. None
See application file for complete search history.

(56) References Cited

U.S. PATENT DOCUMENTS

| 4,902,638 | A | * | 2/1990 | Muto | 438/4 |
|---|---|---|---|---|---|
| 5,671,027 | A | * | 9/1997 | Sasano et al. | 349/46 |
| 5,694,185 | A | * | 12/1997 | Oh | 349/46 |
| 5,852,482 | A | * | 12/1998 | Kim | 349/46 |
| 6,014,191 | A | * | 1/2000 | Kim et al. | 349/54 |
| 2002/0021381 | A1 | * | 2/2002 | Yoo et al. | 349/43 |

FOREIGN PATENT DOCUMENTS

JP    06208130 A    7/1994

OTHER PUBLICATIONS

Machine translation of JP 06-208130.*

* cited by examiner

*Primary Examiner* — Lucy P Chen
(74) *Attorney, Agent, or Firm* — Morgan, Lewis & Bockius LLP

(57) ABSTRACT

A flat panel display device includes a gate line and a data line crossing each other to define a pixel area, a pixel electrode in the pixel area, and a thin film transistor having a gate electrode connected to the gate line, a source electrode connected to the data line, and a drain electrode connected to the pixel electrode, wherein the gate line has at least two or more separated gate line portions where the gate line crosses the data line.

9 Claims, 32 Drawing Sheets

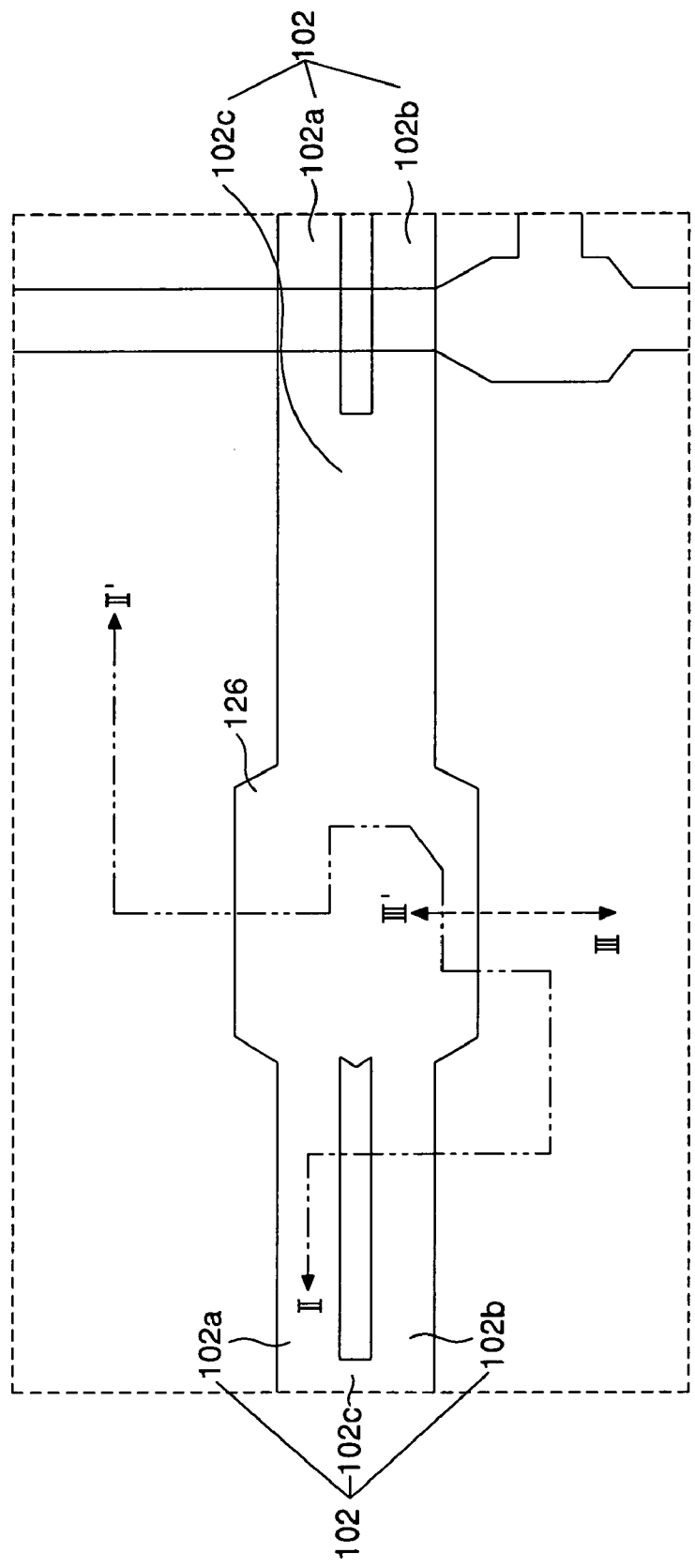

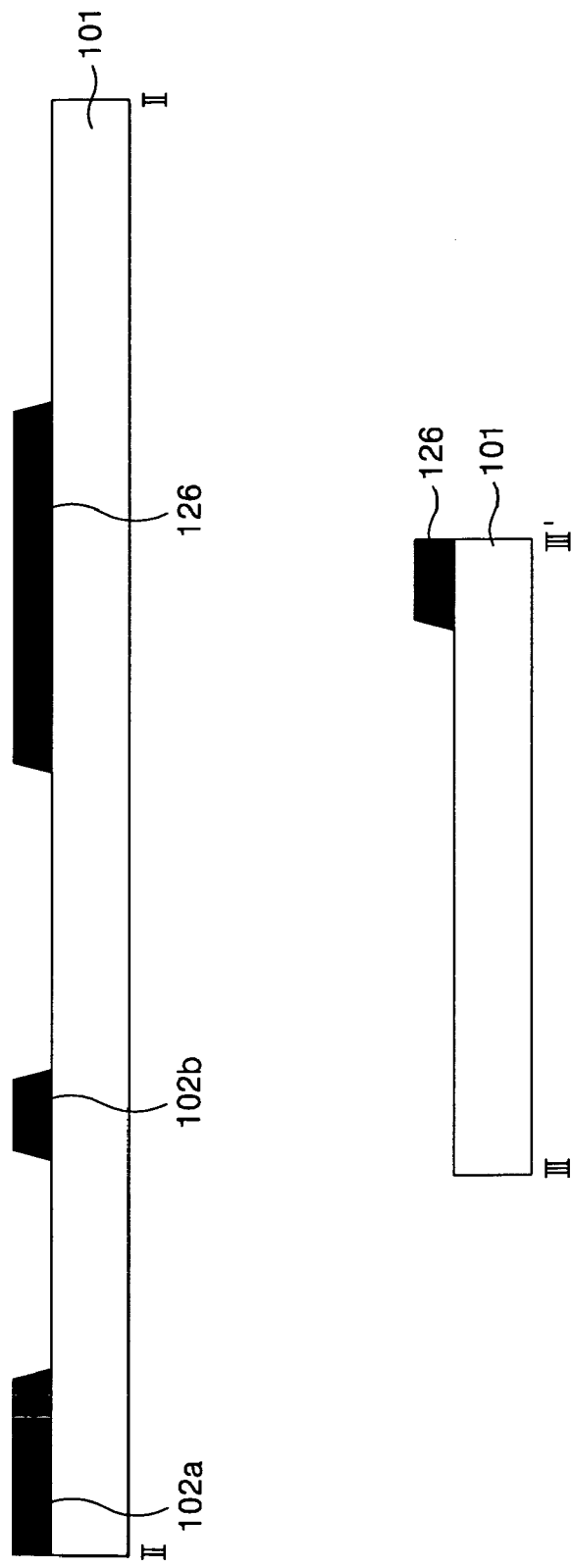

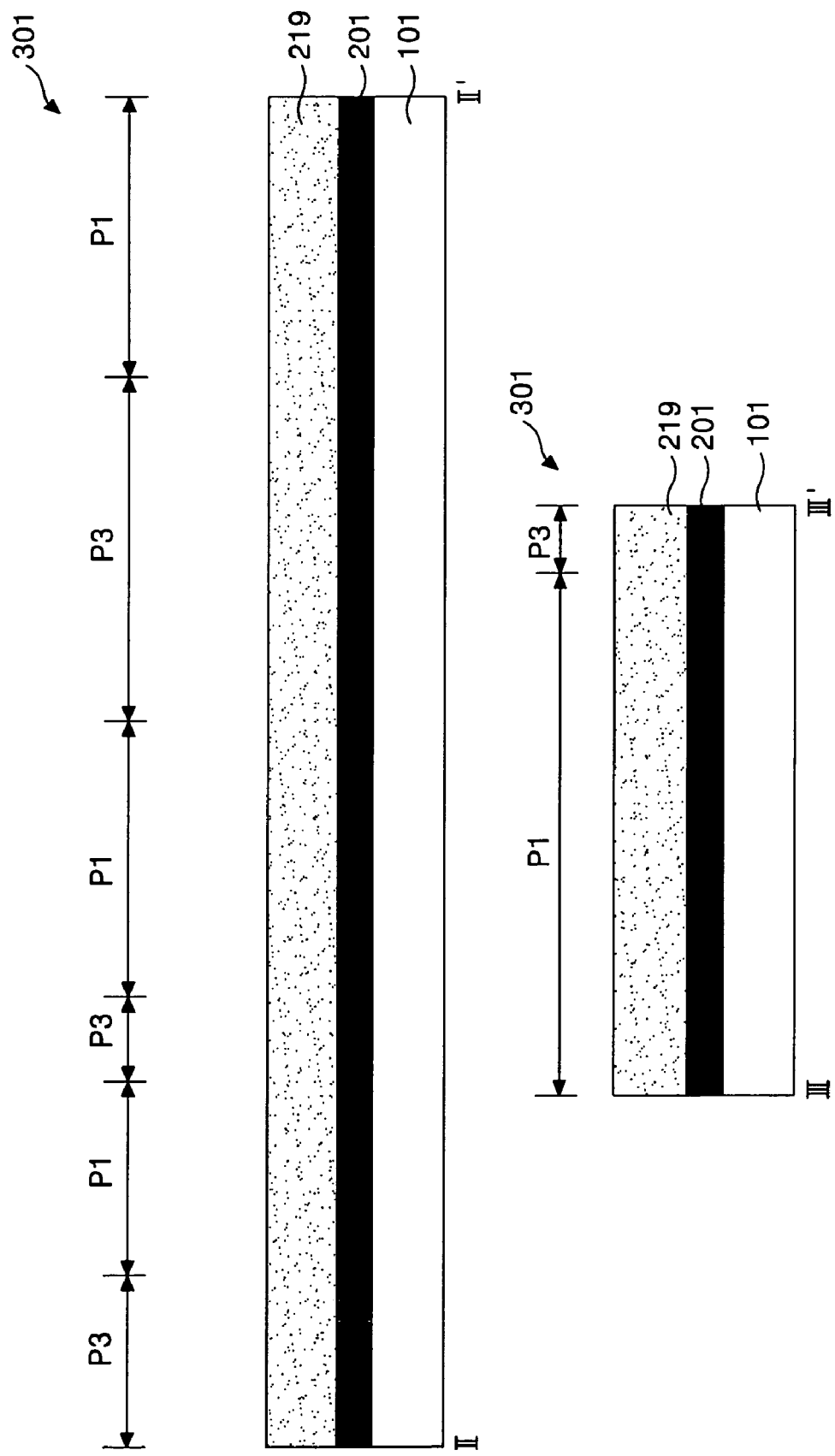

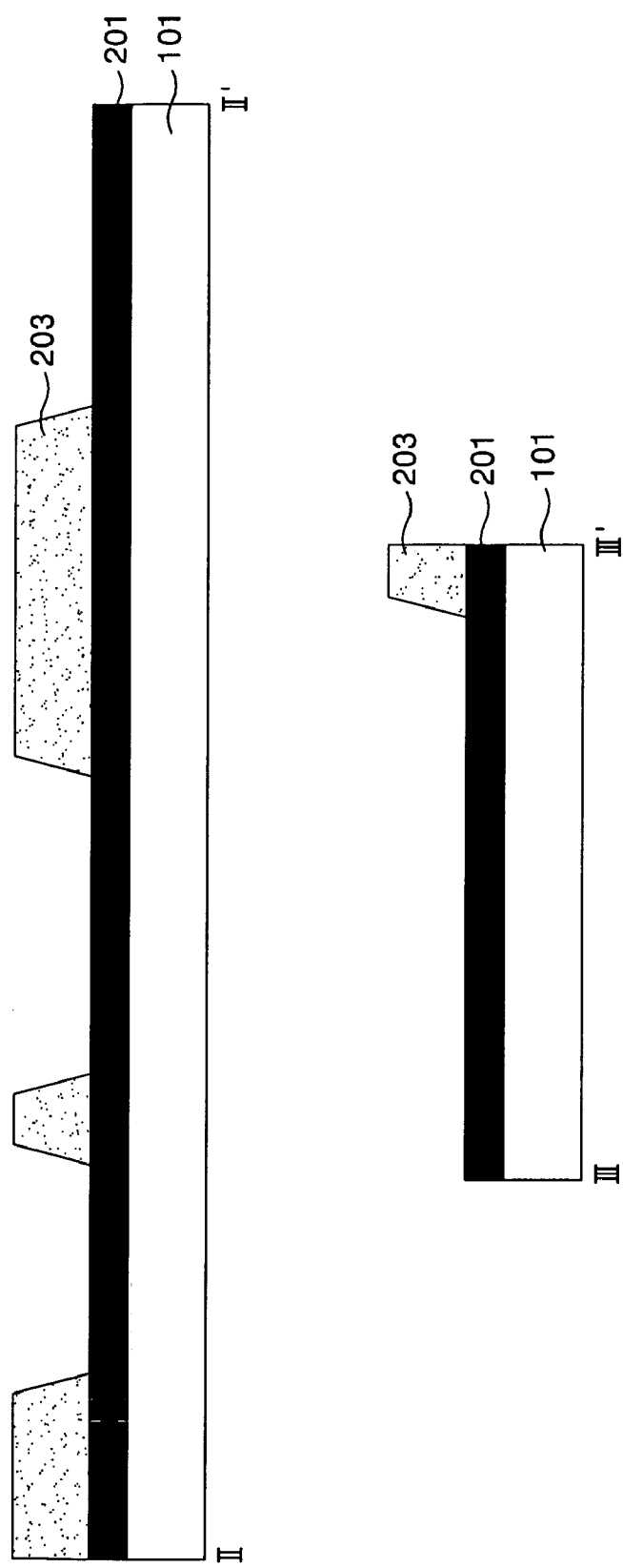

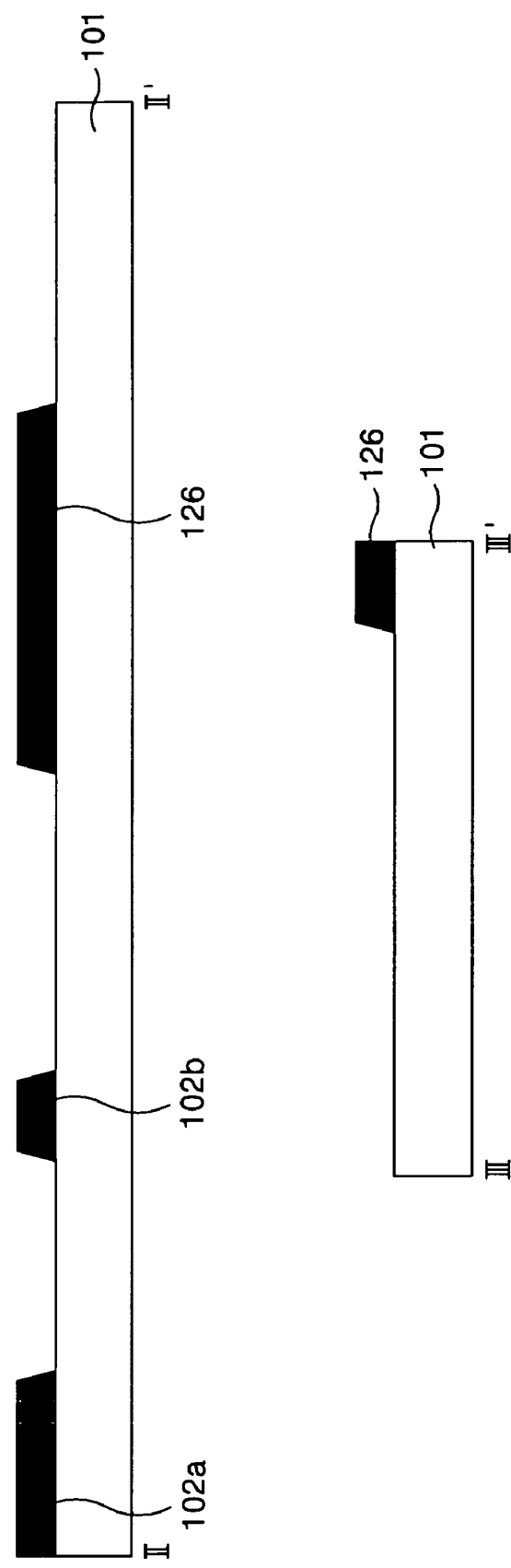

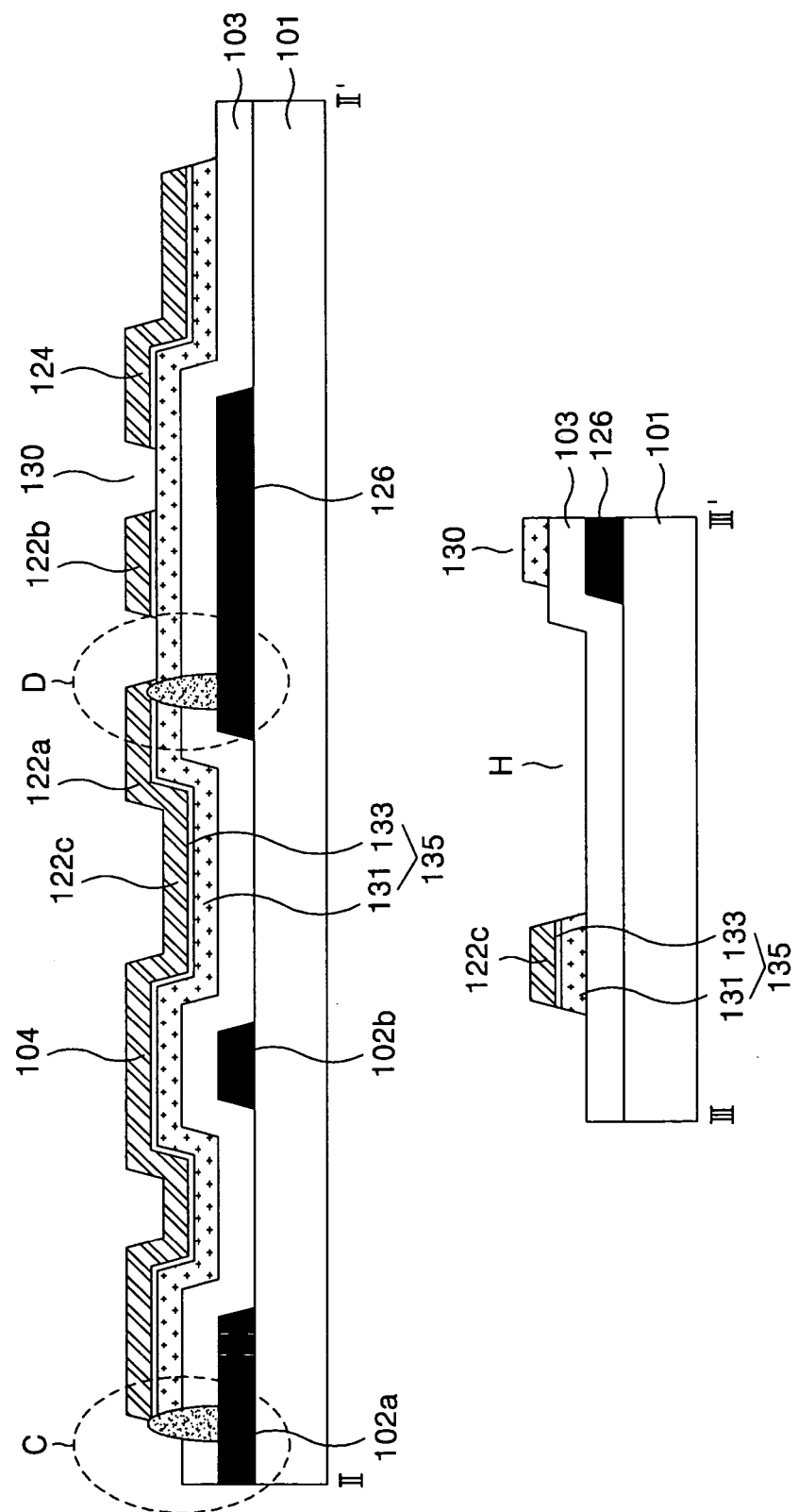

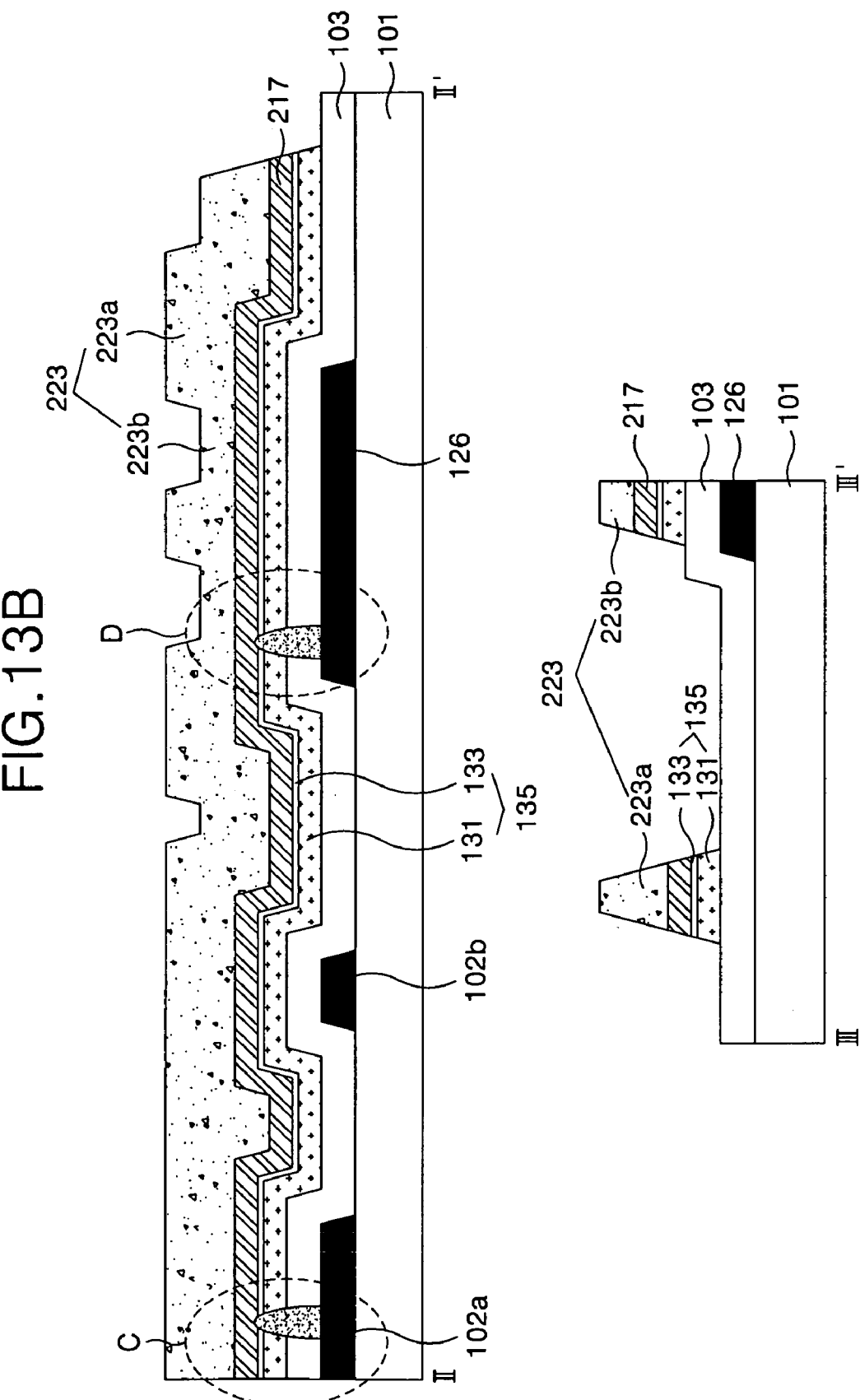

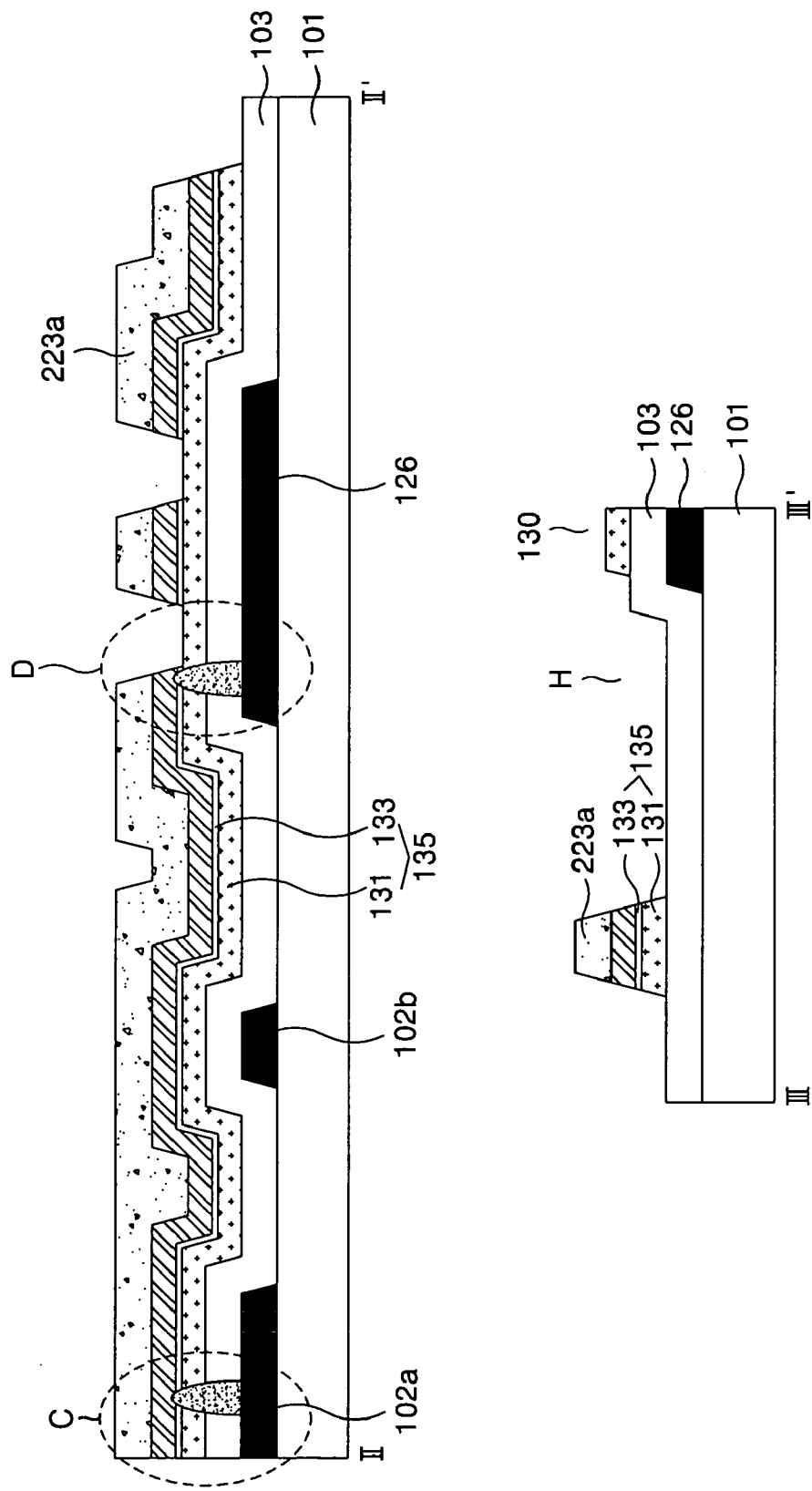

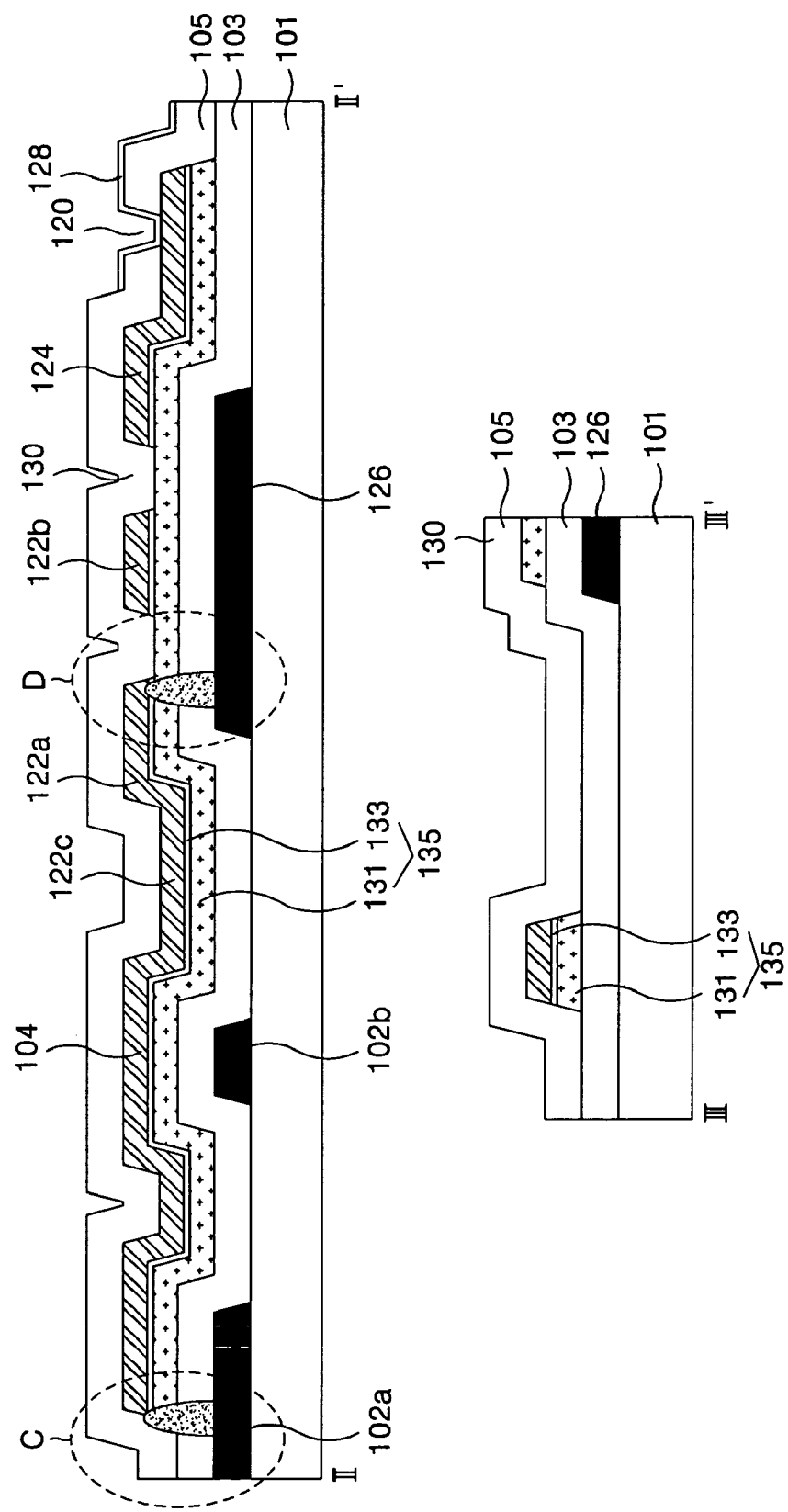

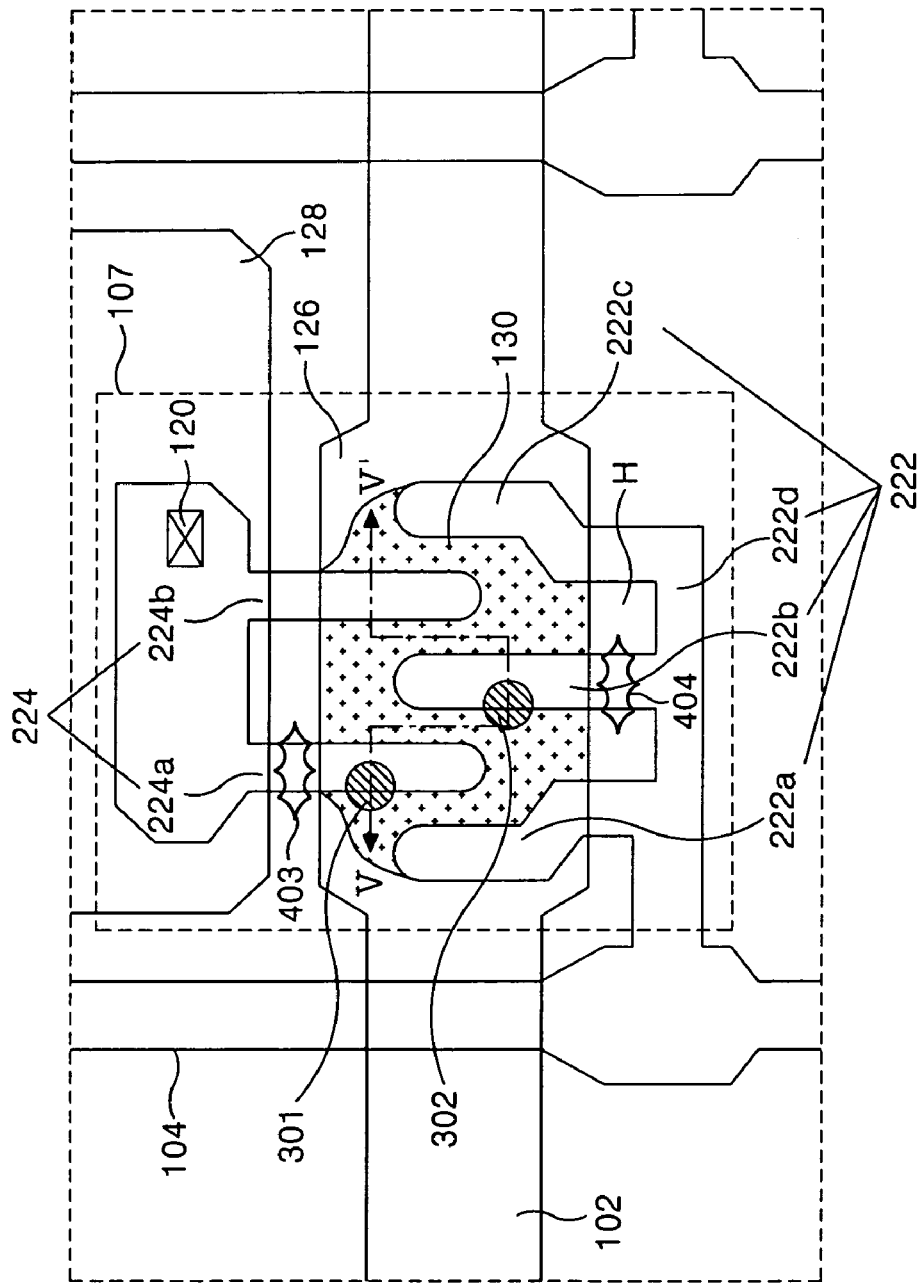

FLAT PANEL DISPLAY AND FABRICATING METHOD THEREOF

This application claims the benefit of the Korean Patent Application No. P2005-0135046 filed in Korea on Dec. 30, 2005 which is hereby incorporated by reference in its entirety.

BACKGROUND OF THE INVENTION

1. Field of the Invention

The present invention relates to a display device, and more particularly to a flat panel display and a fabricating method thereof.

2. Description of the Related Art

A liquid crystal display (LCD) device controls the light transmittance of a liquid crystal that has a dielectric anisotropy by use of an electric field, thereby displaying a picture. The LCD device includes a liquid crystal panel having a pixel matrix and a drive circuit for driving the liquid crystal panel. FIG. 1 is a block diagram illustrating an LCD device of the related art. As shown in FIG. 1, a related art LCD device includes a liquid crystal panel 10 having a pixel matrix, a gate driver 12 for driving a gate line 2 of the liquid crystal panel 10, a data driver 14 for driving a data line of the liquid crystal panel 10, and a timing controller 16 for controlling the gate driver 12 and the data driver 14. The liquid crystal panel 10 includes a pixel matrix having a thin film transistor 6, which is formed adjacent to the crossing of a gate line 2 and a data line 4. Likewise, an organic electro-luminescence device (OLED) includes a pixel matrix having a thin film transistor, which is formed adjacent to the crossing of a gate line and a data line. Each of the pixels includes a liquid crystal cell Clc that controls a light transmission amount in accordance with a data signal through a thin film transistor 6, which drives the liquid crystal cell Clc.

The thin film transistor 6 supplies a data signal from the data line 4 to the liquid crystal cell Clc in response to a scan signal of the gate line 2. The liquid crystal cell Clc makes the arrangement of the liquid crystal molecules change in accordance with the data signal, thereby realizing gray levels. The gate driver 14 sequentially supplies the scan signal to the gate line 2 in response to a control signal from the timing controller 18. The data driver 16 converts a digital data from the timing controller 18 into an analog data signal and supplies the analog signal to the data line 4. The timing controller 18 supplies the control signal which controls the gate driver 14 and the data driver 16, and also supplies the digital data to the data driver 16.

FIG. 2 is a plan view of a thin film transistor and a signal line included in a thin film transistor array substrate of the LCD device shown in FIG. 1. FIG. 3 is a cross-sectional view of a thin film transistor array substrate shown in FIG. 2 along I-I'. Referring to FIGS. 2 and 3, the thin film transistor 6 includes a gate electrode 26 connected to the gate line 2, a source electrode 22 connected to the data line 4 and a drain electrode 24 connected to the pixel electrode 28.

The thin film transistor 6, the signal lines, such as the gate line 2 and the data line 4, and a pixel electrode 28, are formed through mask processes that include photolithography, etching and cleaning processes. The gate line 2 and the gate electrode 26 are made of aluminum, such as AlNd, or copper. A low resistance metal, such as copper, is used if low resistance is desired. However, when the gate line 2 and the gate electrode 26 are made, conductive particles can be caught on the upper surface of the gate electrode 26 or gate line 2. For example, copper particles can be caught on the upper surface of a copper gate line from the fabrication of the copper gate line. Copper particles are harder to clean from an upper surface than other types of metallic particles.

A gate insulating film 3 of $SiN_x$ and a semiconductor layer 35 is formed on the upper surface of the gate electrode 26 and the gate line 2. The gate insulating film 3 of $SiN_x$ insulates the gate line 2 and the gate electrode 26 from the data line 4. The conductive particles from the fabrication of the gate line 2 and the gate electrode 26 may penetrate the $SiN_x$ and the semiconductor layer 35. Due to the spread or diffusion of the conductive particles, a short circuit can be generated between the gate line 2 and the data line 4, as shown in part A of FIGS. 2 and 3, and/or a short circuit can be generated between the gate electrode 26 and the source electrode 22, as shown in part B of FIGS. 2 and 3. The short circuit at part A causes abnormal driving of the gate line 2 so as to generate a black vertical line in a completed LCD device. The short circuit at part B shorts the source electrode 22 to the drain electrode 24, which causes a pixel to be a constant white spot in the panel of the LCD device. Typically, such a short circuit at B between the source electrode 22 and drain electrode 24 is broken by irradiation of laser to make the pixel a dark spot rather than a white spot. Such defects deteriorate the mass production yield and productivity of the LCD device. To reduce the generation of these short circuits, a plurality of cleaning processes for removing conductive particles are performed after formation of the gate line 2 and the gate electrode 26. These additional cleaning processes create another problem in that the fabricating process of the LCD device is more complicated and fabrication time is increased.

SUMMARY OF THE INVENTION

Accordingly, the present invention is directed to a flat panel display and a fabricating method thereof that substantially obviate one or more of the problems due to limitations and disadvantages of the related art.

An object of the present invention to provide a LCD device configured for easy repair of a short circuit between a gate line and a data line, or between a gate electrode and a source electrode, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a flat panel display device according to an aspect of the present invention includes a gate line and a data line crossing each other to define a pixel area, a pixel electrode in the pixel area, and a thin film transistor having a gate electrode connected to the gate line, a source electrode connected to the data line, and a drain electrode connected to the pixel electrode, wherein the gate line has at least two or more separated gate line portions where the gate line crosses the data line.

In another aspect, a flat panel display device includes a gate line and a data line crossing each other to define a pixel area, a pixel electrode in the pixel area, and a thin film transistor having a gate electrode connected to the gate line, a source electrode connected to the data line, and a drain electrode connected to the pixel electrode, wherein the source electrode of the thin film transistor has at least two separated source electrode portions extending from another source electrode portion toward a channel part of the thin film transistor.

In another aspect, a flat panel display device includes a gate line and a data line crossing each other to define a pixel area, a pixel electrode in the pixel area, and a thin film transistor having a gate electrode connected to the gate line, a source electrode connected to the data line, a drain electrode connected to the pixel electrode, wherein the gate line has at least two or more separated gate line portions where the gate line crosses the data line, and the source electrode of the thin film transistor has at least two separated source electrode portions extending from another source electrode portion toward a channel part of the thin film transistor.

In another aspect, a flat panel display device includes a plurality of gate lines; a plurality of data lines crossing the plurality of gate lines; a plurality of pixel electrodes respectively formed in pixel areas of liquid crystal cells defined by the plurality of gate lines and the plurality of data lines; and a plurality of thin film transistors that each includes a gate electrode connected to the gate line, a source electrode, a drain electrode connected to the pixel electrode and a semiconductor channel, wherein the data line has at least two or more separated data line portions where the data line crosses the gate line.

A flat panel display device includes: a plurality of gate lines; a plurality of data lines crossing the gate lines; a plurality of pixel electrodes respectively formed in pixel areas of a liquid crystal cells defined by the plurality of gate lines and the plurality of data lines; and a plurality of thin film transistors that each includes a gate electrode connected to the gate line, a source electrode, a drain electrode connected to the pixel electrode and a semiconductor channel, wherein the drain electrode of each of the plurality of thin film transistors has at least two separated drain electrode portions extending from another drain electrode portion toward the semiconductor channel.

In another aspect, a fabricating method of a flat panel display device includes: forming a first conductive pattern group having a gate line having at least two separated gate line portions and a gate electrode on a substrate; forming a gate insulating film to cover the first conductive pattern group, forming thin film transistors having a channel and a second conductive pattern, which includes a data line crossing the separated gate line portions, a source electrode connected to the data line, and a drain electrode facing the source electrode; forming a passivation film that covers the gate insulating film and the thin film transistors; forming a first contact hole in the passivation film to expose the drain electrode; and forming a pixel electrode connected to the drain electrode through the first contact hole.

In another aspect, a fabricating method of a flat panel display device includes: forming a first conductive pattern group having a gate line and a gate electrode connected to the gate line on a lower substrate; forming a gate insulating film to cover the first conductive pattern group; forming a thin film transistor having a channel and a second conductive pattern, which includes a data line, at least two separated source electrode portions extending from another source electrode portion toward the channel, and a drain electrode positioned between the at least two separated source electrode portions; forming a passivation film that covers the gate insulating film and the thin film transistor; forming a first contact hole in the passivation film to expose the drain electrode; and forming a pixel electrode connected to the drain electrode through the first contact hole.

In another aspect, a fabricating method of a flat panel display device includes: forming a first conductive pattern group having a gate line having two or more separated gate line portions and a gate electrode on a substrate; forming a gate insulating film to cover the first conductive pattern group; forming thin film transistors having a channel, and a second conductive pattern group inclusive of a plurality of data lines crossing the gate lines, at least two separated source electrode portions extending from another source electrode portion toward the channel, and a drain electrode positioned between the at least two separated source electrode portions; forming a passivation film that covers the gate insulating film and the thin film transistors; forming a first contact hole in the passivation film to expose the drain electrode; and forming a pixel electrode connected to the drain electrode through the first contact hole.

In still another aspect, a fabricating method of a flat panel display device includes: forming a first conductive pattern group that includes gate lines each having a gate electrode; forming a gate insulating film to cover the first conductive pattern group; forming a second conductive pattern group including data lines that are divided into at least data line portions where the data lines cross the gate lines, a source electrode connected to the data line, a drain electrode opposed to the source electrode, and a semiconductor channel for a thin film transistor; forming a protective film including for covering the second conductive group; forming a first contact hole in the protective film for exposing the drain electrode; and forming a pixel electrode connected via the first contact hole to the drain electrode.

In still another aspect, a fabricating method of a flat panel display device includes: forming a first conductive pattern group that includes gate lines each having a gate electrode; forming a gate insulating film to cover the first conductive pattern group; forming a second conductive pattern group including data lines crossing the gate lines, a source electrode connected to the data line, a drain electrode separated into at least two drain electrode portions and a semiconductor channel for a thin film transistor; forming a protective film including for covering the second conductive group; forming a first contact hole in the protective film for exposing the drain electrode; and forming a pixel electrode connected via the first contact hole to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 10A and 10B are diagrams of a first conductive pattern group on the thin film transistor array substrate according to a first embodiment of the present invention.

FIGS. 11A to 11C are diagrams for explaining the first mask process for the thin film transistor array substrate according to a first embodiment of the present invention.

FIGS. 12A and 12B are diagrams of an insulating film and a second conductive group on the thin film transistor array substrate according to a first embodiment of the present invention.

FIGS. 13A to 13D are diagrams for explaining the second mask process of the thin film transistor array substrate according to a first embodiment of the present invention.

FIGS. 15A and 15B are diagrams of pixel electrode on the thin film transistor array substrate according to a first embodiment of the present invention.

FIG. 18A is a plan view of a thin film transistor array substrate according to a third embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
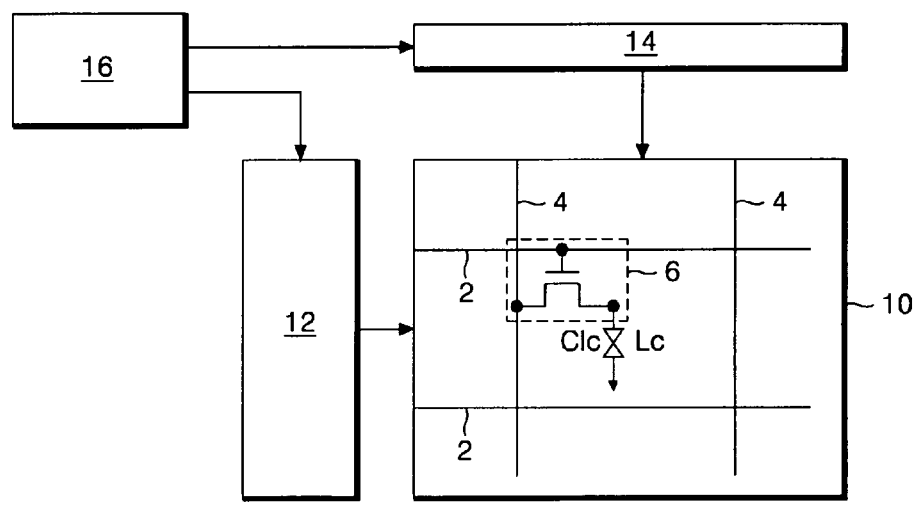
FIG. 1 is a block diagram illustrating an LCD device of the related art.
Figure 2:
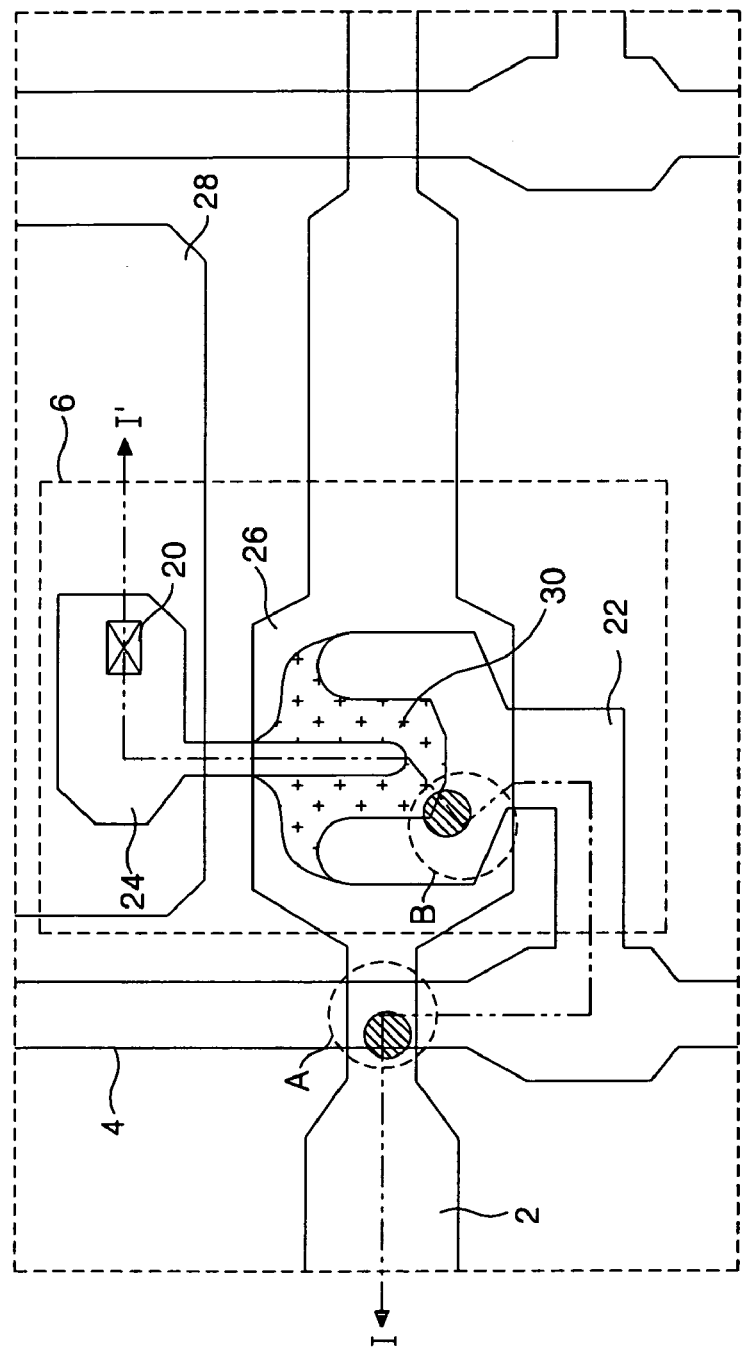
FIG. 2 is a plan view of a thin film transistor and a signal line included on a thin film transistor array substrate of the LCD device shown in FIG. 1.
Figure 3:
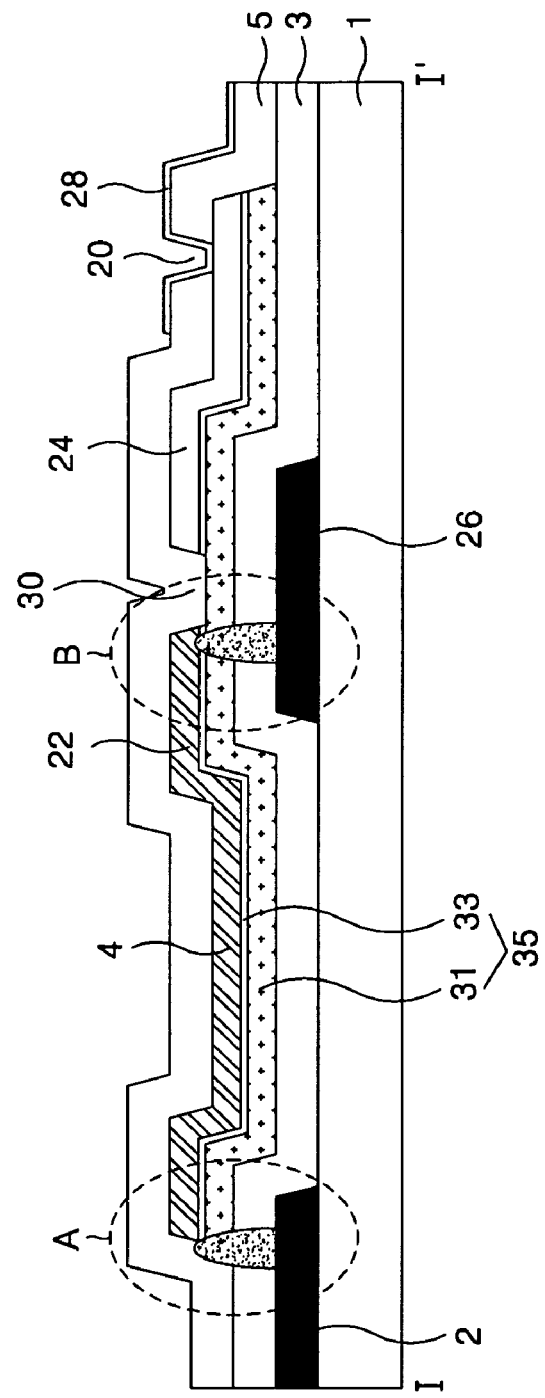
FIG. 3 is a cross-sectional view of a thin film transistor array substrate shown in FIG. 2 along line I-I'.
Figure 4:
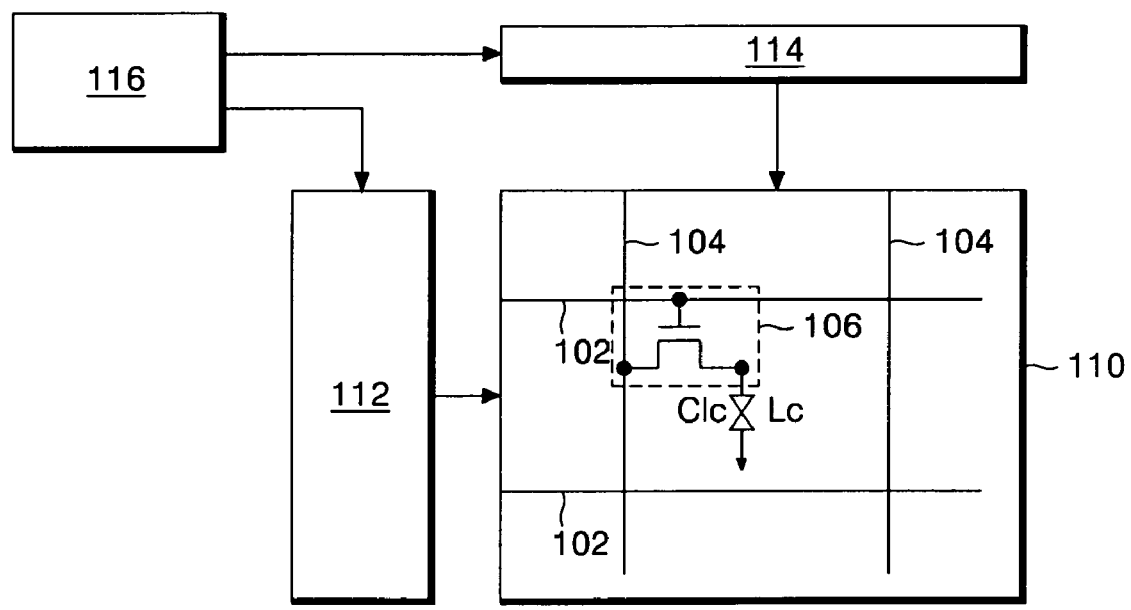
FIG. 4 is a block diagram illustrating a LCD device according to a first embodiment of the present invention.

FIG. 4 is a block diagram illustrating an LCD device according to a first embodiment of the present invention. The LCD device according to an embodiment of the present invention controls the light transmittance of a flat panel having dielectric anisotropy by use of an electric field, thereby displaying a picture. The LCD device includes a liquid crystal panel having a pixel matrix and a drive circuit for driving the liquid crystal panel. The LCD device, as shown in FIG. 4, includes a liquid crystal panel 110 having a pixel matrix, a gate driver 112 for driving a gate line 102 of the liquid crystal panel 110, a data driver 114 for driving a data line of the liquid crystal panel 110, and a timing controller 116 for controlling the gate driver 112 and the data driver 114.

The liquid crystal panel 110 includes a matrix of pixels, which are formed adjacent to the crossing of a gate line 102 and a data line 104. Each of the pixels includes a liquid crystal cell Clc, which controls the light transmission amount in accordance with a data signal, and a thin film transistor 106 for driving the liquid crystal cell Clc. The thin film transistor 106 supplies a data signal from the data line 104 to the liquid crystal cell Clc in response to a scan signal of the gate line 102. Each of the pixels includes a liquid crystal cell Clc that controls a light transmission amount in accordance with a data signal through a thin film transistor 6, which drives the liquid crystal cell Clc.

The gate driver 104 sequentially supplies the scan signal to the gate line 102 in response to the control signal from the timing controller 108. The data driver 106 converts a digital data from the timing controller 118 into an analog data signal to supply to the data line 104. The timing controller 118 supplies the control signal which controls the gate driver 104 and the data driver 106, and also supplies a digital data to the data driver 106.

Figure 5:
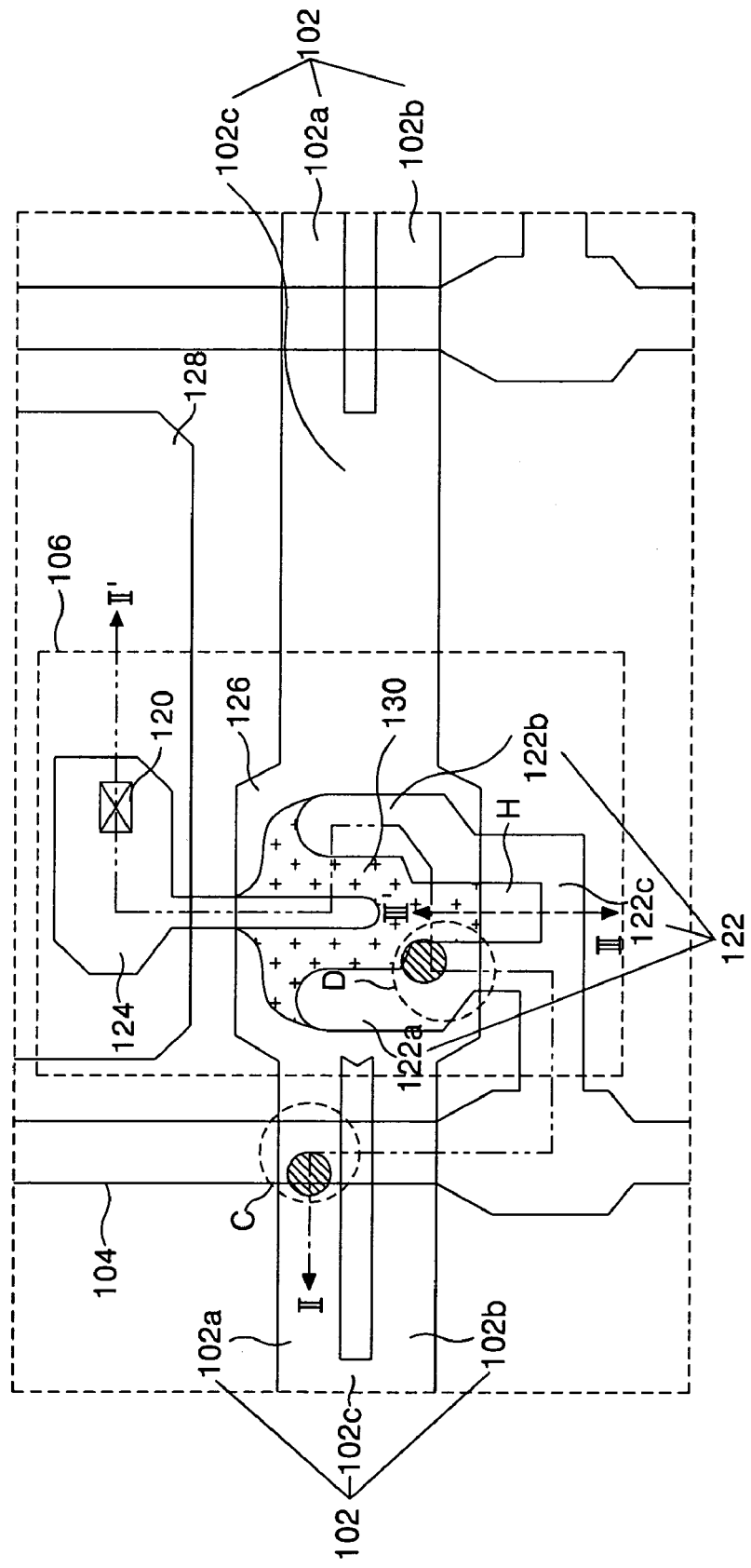
FIG. 5 is a plan view of a thin film transistor and a signal line on a thin film transistor array substrate of LCD device shown in FIG. 4.
Figure 6:
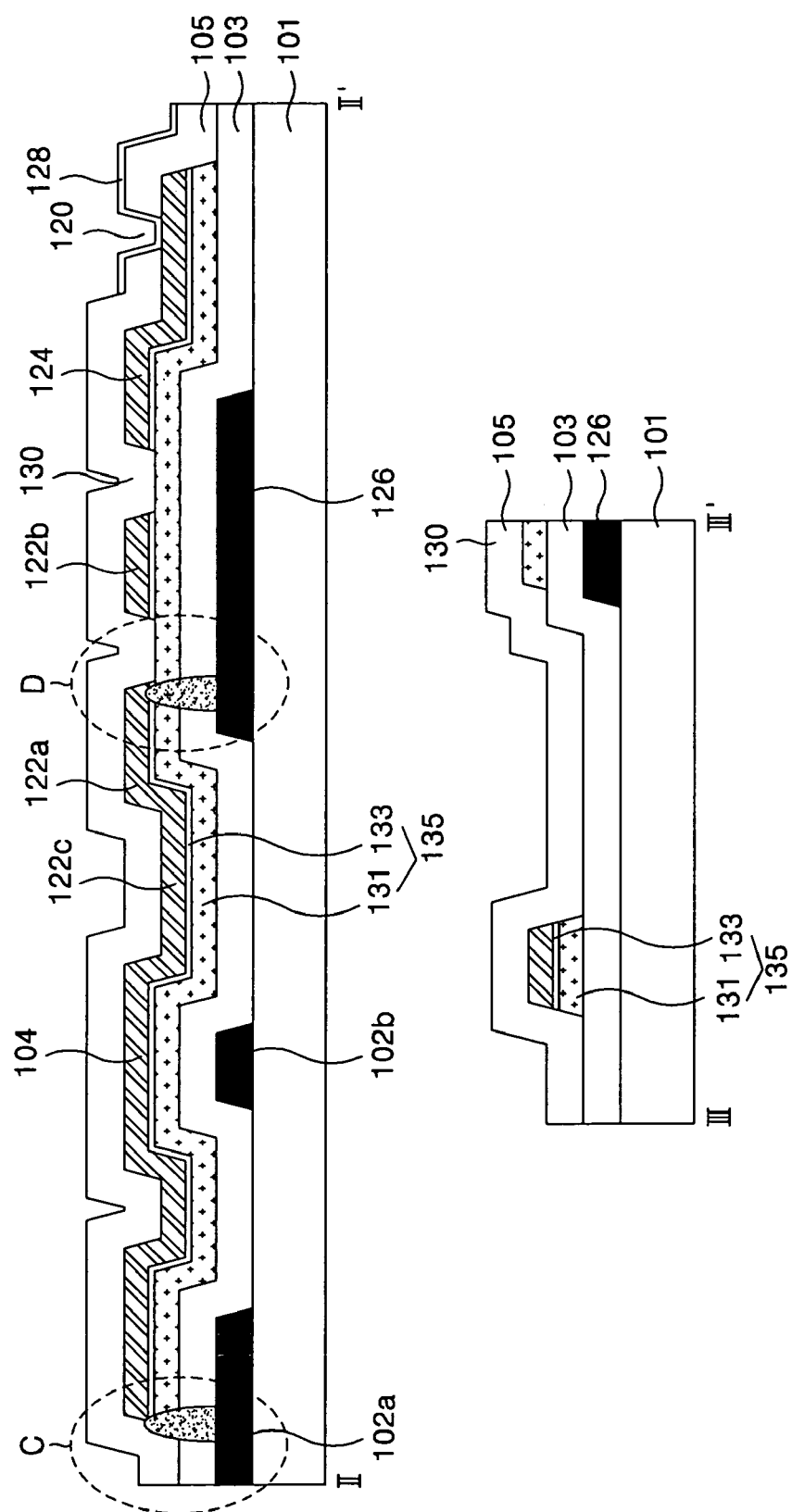
FIG. 6 is a cross-sectional view of the thin film transistor array substrate shown in FIG. 5 along lines II-II' and III-III'.

FIG. 5 is a plan view of a thin film transistor and a signal line on a thin film transistor array substrate of LCD device shown in FIG. 4. FIG. 6 is a cross-sectional view of the thin film transistor array substrate shown in FIG. 5 along lines II-II' and III-III'. FIGS. 5 and 6 are a plan view and a cross-sectional view of a thin film transistor 106 and an area where the gate line 102 crosses the data line 104. As shown in FIGS. 5 and 6, the thin film transistor 106 includes a gate electrode 126 connected to the gate line 102, a source electrode 122 connected to the data line 104 and a drain electrode 124 connected to the pixel electrode 128.

The gate line 102 and the gate electrode 126 are made of a low resistance metal, such as copper (Cu), chromium (Cr), neodymium (Nd) or aluminum containing metal, such as AlNd. Embodiments of the present invention can form the gate line 102, the gate electrode 126 and the gate pad from a low resistance metal, such as copper. The low resistance metal can diffuse through the gate insulating film, and as a result, a short circuit can be generated between the gate line 102 and the data line 104, as shown at part C of FIGS. 5 and 6, or between the gate electrode 126 and the source electrode 122, as shown at part D in FIGS. 5 and 6.

To solve the short circuit problem between the gate line 102 and the data line 104 with a repairing process, the gate line 102 according to an embodiment of the present invention has at least two or more separate gate line portions that cross the data line 104. FIGS. 5 and 6 illustrates an example of the gate line 102 that has at least two or more separate gate line portions 102a and 102b where the gate line 102 crosses the data line 104. In an alternative, the gate line 102 can have three or more separate gate line portions where the gate line 102 crosses the data line 104.

As shown in FIGS. 5 and 6, the gate line 102 according to a first embodiment of the present invention includes first and second gate line portions 102a and 102b where the gate line 102 crosses the data line 104, and a third gate line portion 102c connected to both the first and second gate line portions 102a and 102b where the gate line 102 does not cross the data line 104. Any one of the first and second gate line portions 102a and 102b that forms a short-circuit current path with the data line 104 can be disconnected during a subsequent repair process. In other words, when any one of the first and second gate line portions 102a and 102b is shorted with the data line 104, the shorted gate line portion can be disconnected and bypassed by the other one of the first and second gate line portions 102a and 102b. For example, if a short circuit occurs at part C of gate line portion 102 with data line 4, gate line portion 102a is disconnected by a laser irradiation such that a gate signal can be normally supplied to the gate electrode 122 of the thin film transistor 106 by the gate line portion 102b.

Figure 7:
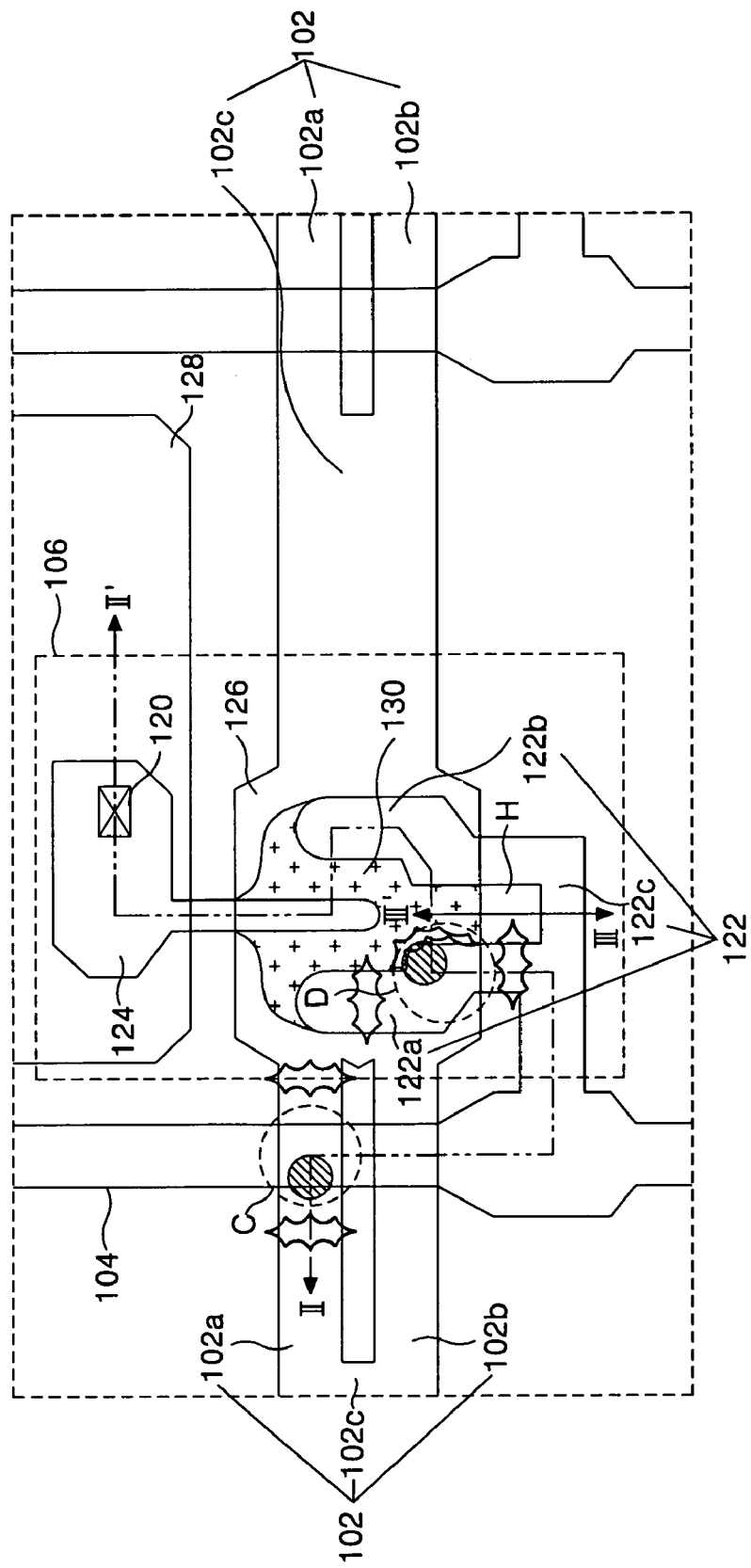
FIG. 7 is a plan view representing repairs of the thin film transistor array substrate according to a first embodiment of the present invention.
Figure 8:
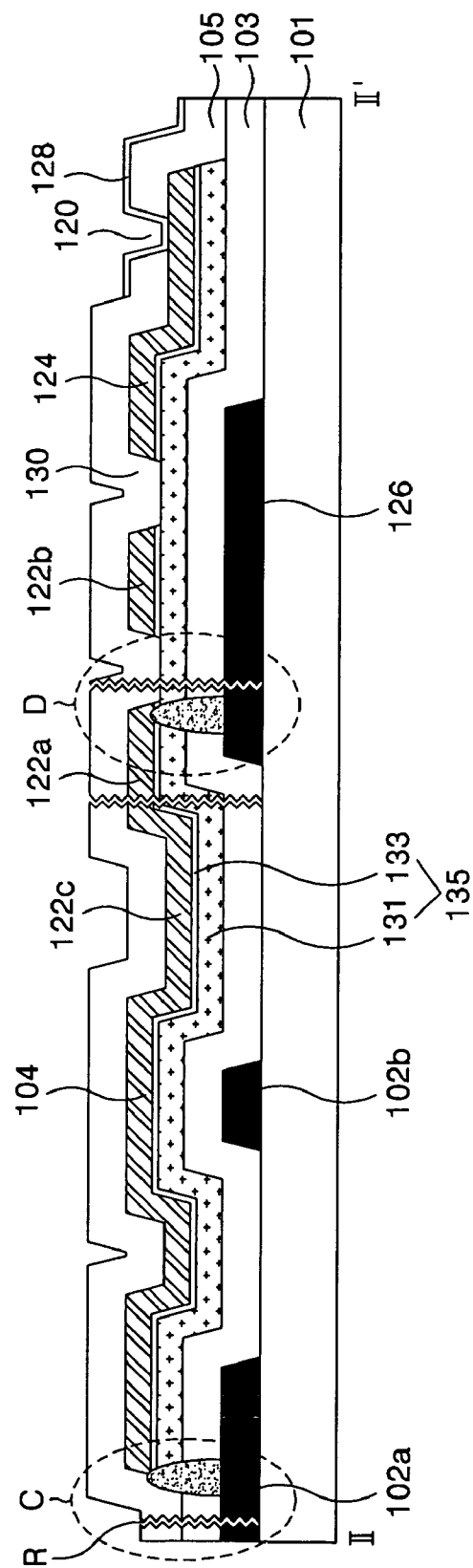
FIG. 8 is a cross-sectional view of the thin film transistor array substrate shown in FIG. 7.

FIG. 7 is a plan view representing repairs of the thin film transistor array substrate according to a first embodiment of the present invention. FIG. 8 is a cross-sectional diagram of the thin film transistor array substrate shown in FIG. 7. In reference to FIGS. 7 and 8, a repairing process will be described in detail for repairing a short circuit at part C between the first gate line 102a and the data line 104.

In the case where the short circuit is generated between the first gate line portion 102a and the data line 104, a laser is irradiated onto both sides of a section of the first gate line portion 102a that is connected to the short circuit at part C. The irradiation can be done through a dual-laser irradiation technique where two lasers irradiate at the same time or by a single-shot laser technique that irradiates one part at time. More specifically, the laser is irradiated onto two parts of the first gate line portion 102a away from the shorted data line 104 such that a section of the first gate line portion 102a overlapping the shorted data line is separated from the gate line portion 102a. Thus, the section of the first gate line portion 102a, which is short circuited to the data line 104 is electrically separated from the gate line 102 and the gate electrode 126. But, on the other hand, the second gate line portion 102B and the third gate line portion 102C are still electrically connected. Accordingly, a scan signal can be supplied to the gate electrode 126 of the thin film transistor 106 through the second gate line portion 102b and the third gate line portion 102c.

FIGS. 5 and 6 also illustrates an example of the source electrode 122 having first and second source electrode portions 122a and 122b that overlap the gate electrode 126 and are on opposite sides of the drain electrode 124. In an alternative, source electrode 122 can have three or more source electrode portions. As shown in FIGS. 5 and 6, lower parts of the first and second source electrode portions 122a and 122b extend from the third source electrode portion 122c in a region where the source electrode 122 does not overlap the gate electrode 126 toward the semiconductor channel part 130 of the thin film transistor. However, middle and upper parts of the first and second source electrode portions 122a and 122b overlap the gate electrode 126 and have a designated distance between them. The first and second source electrodes 122a and 122b receive a pixel data from the data line 104 through the third source electrode portion 122c.

One end of the drain electrode 124 is located between the second and third source electrodes 122a and 122b, and overlaps the gate electrode 126. The other end of the drain electrode 124 is electrically connected to the pixel electrode 128 through a contact hole 120. A semiconductor pattern 135 having an active layer 131 and an ohmic contact layer 133 is formed under the first and second source electrode portions 122a and 122b, and the drain electrode 124. The semiconductor channel part 130 of the thin film transistor 106, which is activated in accordance with the gate voltage applied to the gate electrode 126, is between the drain electrode 124, and the first and second source electrode portions 122a and 122b.

An opening hole H is formed for separating the first and second electrode portions 122a and 122b, and exposing the gate insulating film 103. The opening hole H isolates the third source electrode portion 122c from the channel part 130 of the thin film transistor 106. That is to say, the third source electrode portion 122c is electrically separated from and does not overlap the gate electrode 126. Accordingly, the third source electrode portion 122c can not be electrically short circuited with the gate electrode 126.

Any one of the first and second source electrode portions 122a and 122b that forms a short-circuit current path with the gate electrode 126 can be disconnected during a subsequent repair process. In other words, when any one of the first and second source electrode portions 122a and 122b is shorted with the gate electrode 126, the shorted source electrode portion can be disconnected from the third source electrode portion 122c. In reference to FIGS. 7 and 8, a repairing process will be described in detail for repairing a short circuit at part D between the first source electrode portion 122a and the gate electrode 126.

In the case that the short circuit is at part D between the first source electrode portion 122a and the gate electrode 126, a laser is irradiated onto two laser irradiation parts R on the first source electrode portion 122a such that the two laser irradiation parts R at part D on the first source electrode portion 122a is on opposite sides of the short circuited section of the first source electrode portion 122a and disconnects the first source electrode portion 122a from the third source electrode portion 122c. As a result the section of a first source electrode portion 122a, which is short circuited to the gate electrode 126, is electrically disconnected from another section of the first source electrode portion 122a, which is still connected to the third source electrode portion 122c. The dual laser irradiation technique can be used to disconnect a short circuited source electrode portion as is used to disconnect a short circuited gate line portion so that the same laser equipment can be used for both types of repairs. However, a single laser irradiation can be used to disconnect a short circuited source electrode portion as long as the single laser irradiation is located on a lower part of the source electrode portion that does not overlap the gate electrode and is adjacent to the opening hole H such that the first source electrode portion is separated from the third source electrode portion.

Although a section of the first source electrode portion 122a that electrically connects to the thin film transistor, is electrically disconnected from the third source electrode portion 122c in the example above, the second source electrode portion 122b, which is not electrically shorted with the gate electrode 126 and connected to the thin film transistor, is still electrically connected to the third source electrode portion 122c. Accordingly, pixel data can still be supplied to the thin film transistor via the second source electrode portion 122b to the third source electrode portion 122c. Thus, in the repairing process of embodiments of the present invention, the pixel where the gate electrode and the source electrode are short circuited is not made to be a black spot, but rather, is reconfigured to operate normally.

Figure 9:
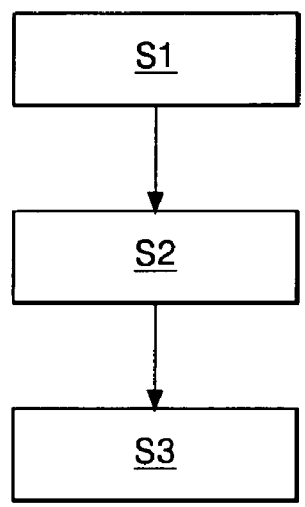
FIG. 9 is a flow chart of a fabrication process for a thin film transistor array substrate according to a first embodiment of the present invention.

FIG. 9 is a flow chart of a fabrication process for a thin film transistor array substrate according to a first embodiment of the present invention. As shown in FIG. 9, the fabrication process of the thin film transistor array substrate according to an embodiment of the present invention can be divided into three steps of wiring-line forming process S1, short circuit inspection process S2, and a short circuit pattern wire-breaking process S3.

The wiring-line forming process S1 is a step of forming wiring lines, such as the gate line and the data line, by a plurality of photolithography processes and etching processes using a mask on a lower substrate made of a transparent insulating material, such as glass.

The short circuit inspection process S2 is a process for inspecting a shorted part by an MPS inspection and a final visual inspection for short circuit and wire breakage by connecting each wiring line to an external circuit after the wiring line forming process S1.

The short circuit pattern wire-breaking process S3 irradiates a laser onto the short circuit part found after the short circuit inspection process S2 to bypass the short circuit part, thereby repairing the thin film transistor array substrate.

FIGS. 10A and 10B are diagrams of a first conductive pattern group on the thin film transistor array substrate according to a first embodiment of the present invention. Referring to FIGS. 10A and 10B, a first conductive pattern group inclusive of the first to third gate line portions 102a, 102b and 102c, and the gate electrode 126 is formed on the lower substrate 101 by use of a first mask process.

FIGS. 11A to 11C are diagrams for explaining the first mask process for the thin film transistor array substrate according to a first embodiment of the present invention. As shown in FIG. 11A, the gate metal layer 201 is formed by a deposition method, such as sputtering, on the lower substrate 101. Afterwards, a photo-resist 219 is formed on the entire surface of the upper part of a gate metal layer 201. And, a first mask 301 is aligned to the upper part of the lower substrate 101. The first mask 301 includes a transmission area P1 through which an ultraviolet ray is transmitted and a shielding area P3 that intercepts the ultraviolet ray.

The photo-resist 219 is exposed and developed by use of the first mask 301, thereby forming a photo-resist pattern 203 at an area corresponding to the shielding area P3. The gate metal layer 201 is patterned by an etching process using the photo-resist pattern 203, thereby forming the first conductive pattern group, as illustrated in FIG. 11B. The gate metal layer 201 can be made of a low resistance metal, such as copper. Subsequently, the photo-resist pattern 203 is removed by a stripping process, as shown in FIG. 11C.

Figure 12A:
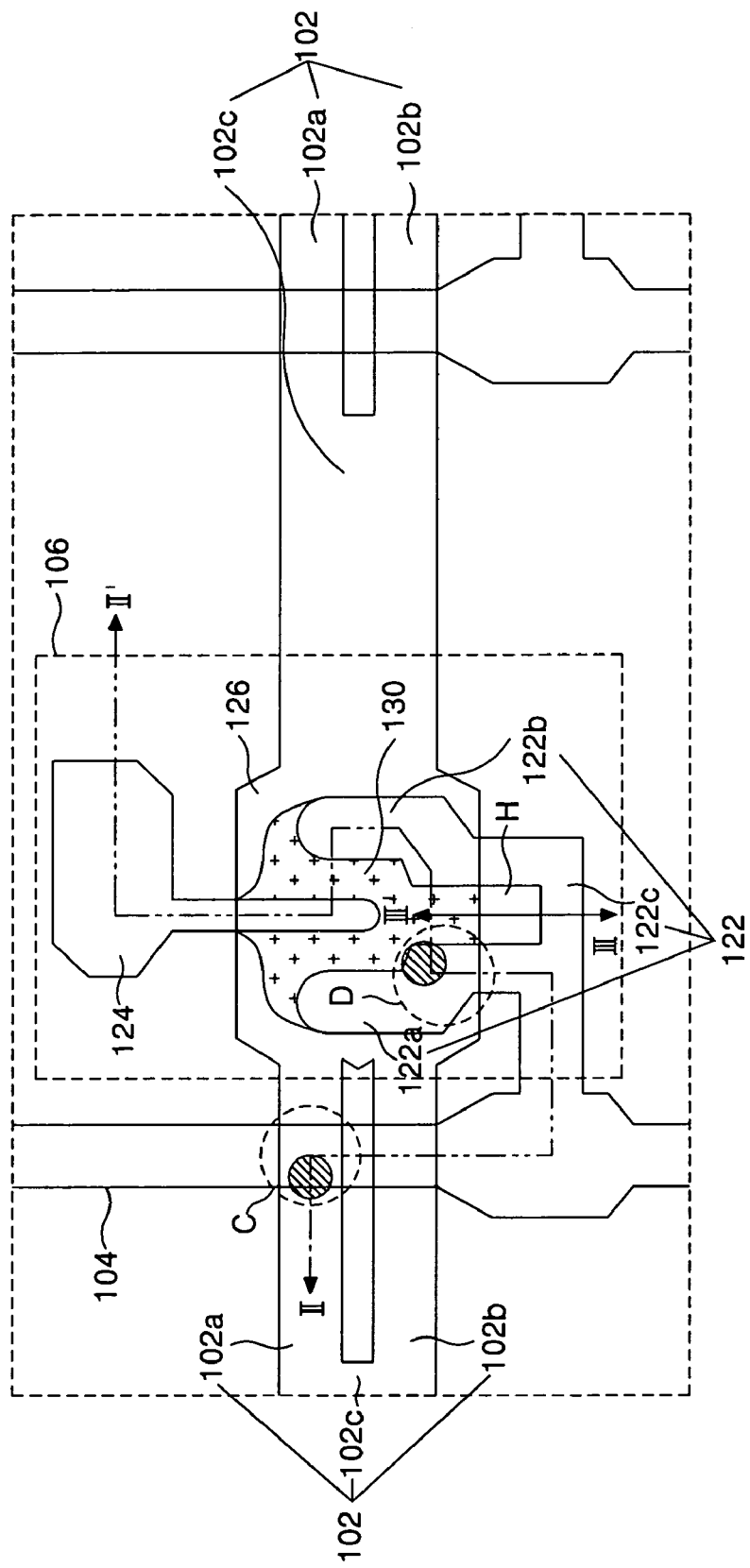

FIGS. 12A and 12B are diagrams of an insulating film and a second conductive group on the thin film transistor array substrate according to a first embodiment of the present invention. Referring to FIGS. 12A and 12B, the gate insulating film 103 is formed on the lower substrate 101 where the first conductive pattern group is formed. And, a second conductive pattern group inclusive of the data line 104, the first to third source electrode portions 122a, 122b and 122c, and the drain electrode 124, an opening hole H, and a semiconductor 135 having an active layer 131 and an ohmic contact layer 133 are formed on the gate insulating film 103 by use of a second mask.

FIGS. 13A to 13D are diagrams for explaining the second mask process of the thin film transistor array substrate step by step according to a first embodiment of the present invention. The gate insulating film 103, an amorphous silicon layer 211, an n+ amorphous silicon layer 213 and a source/drain metal layer 217 are sequentially formed on the lower substrate 101 where the first conductive pattern group is formed. Herein, the gate insulating material 103 is made of an inorganic insulating material, such as silicon oxide ($SiO_x$) or silicon nitride ($SiN_x$).

Subsequently, a second mask 303 is arranged on the upper part of the lower substrate 101 after forming the photo-resist 219 over the source/drain metal layer 217. The second mask 303 includes a transmission area P1, which transmits an ultraviolet ray, a partial transmission area P2 that transmits a part of the ultraviolet ray, and a shielding area P3 that intercepts the ultraviolet ray. The partial transmission area P2 of the second mask substrate 303 includes a diffractive exposure part or a transflective part, which transmits part of the ultraviolet ray.

The photo-resist 219 is exposed and developed by use of the second mask 303, thereby forming a photo-resist pattern 223 having a stepped difference, as shown in FIG. 13B, in a part corresponding to a partial transmission area P2 and a shielding area P3 of the second mask 303. That is to say, the second photo-resist pattern 223b formed in the partial transmission area P2 has a lower height that the first photo-resist pattern 223a formed in the shielding area P3.

The source/drain metal layer 217 exposed by using the photo-resist pattern 223, and the n+ amorphous silicon layer 213 and the amorphous silicon layer 211 of the exposed source/drain metal layer 217 lower part are sequentially etched to be removed. If the source/drain metal layer 217, the n+ amorphous silicon layer 213 and the amorphous silicon layer 211 are sequentially removed by use of the photo-resist pattern 223, as shown in FIG. 13B, the data line 104, the semiconductor pattern 135 and the opening hole H are formed.

Figure 13A:
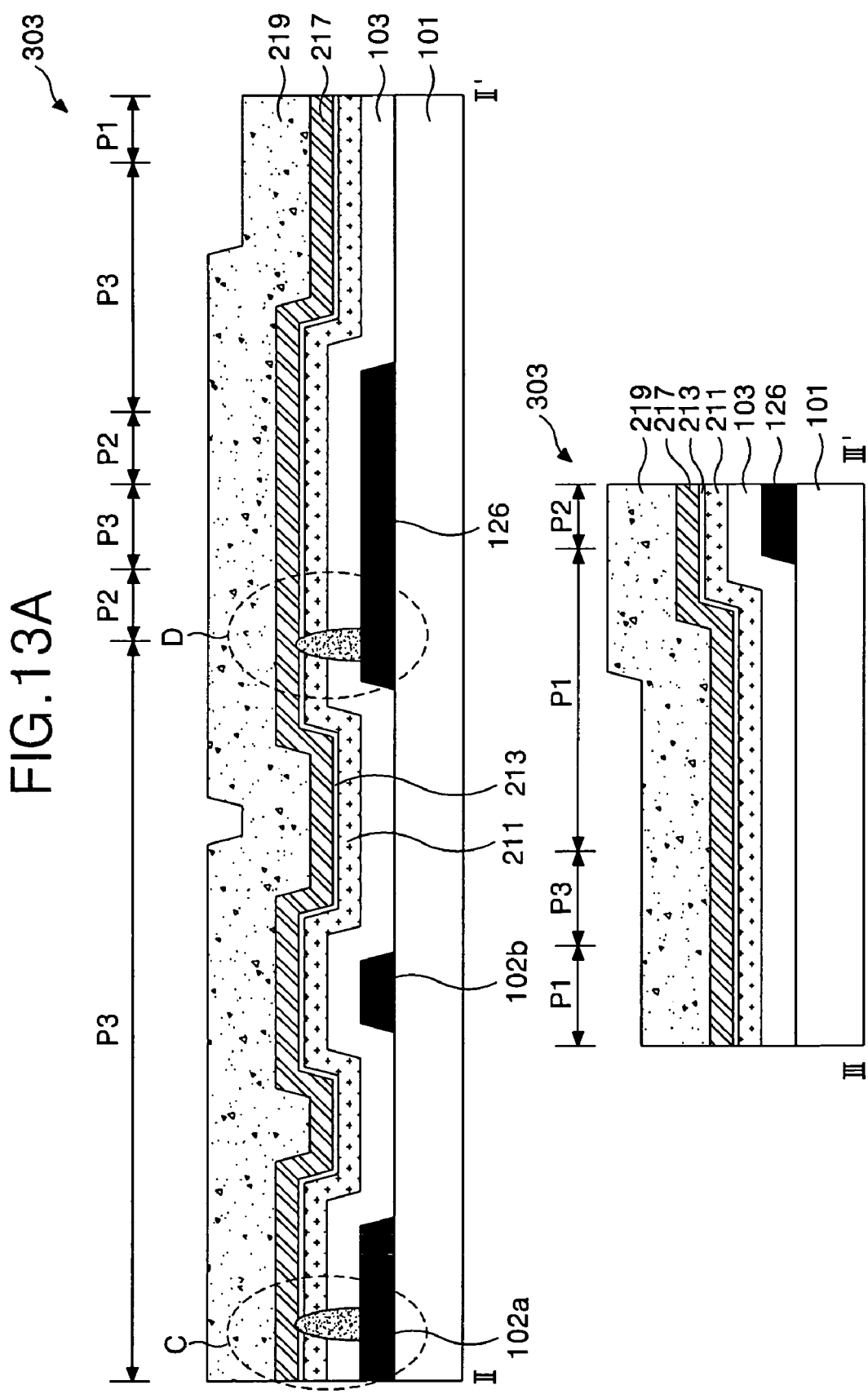
Figure 13D:
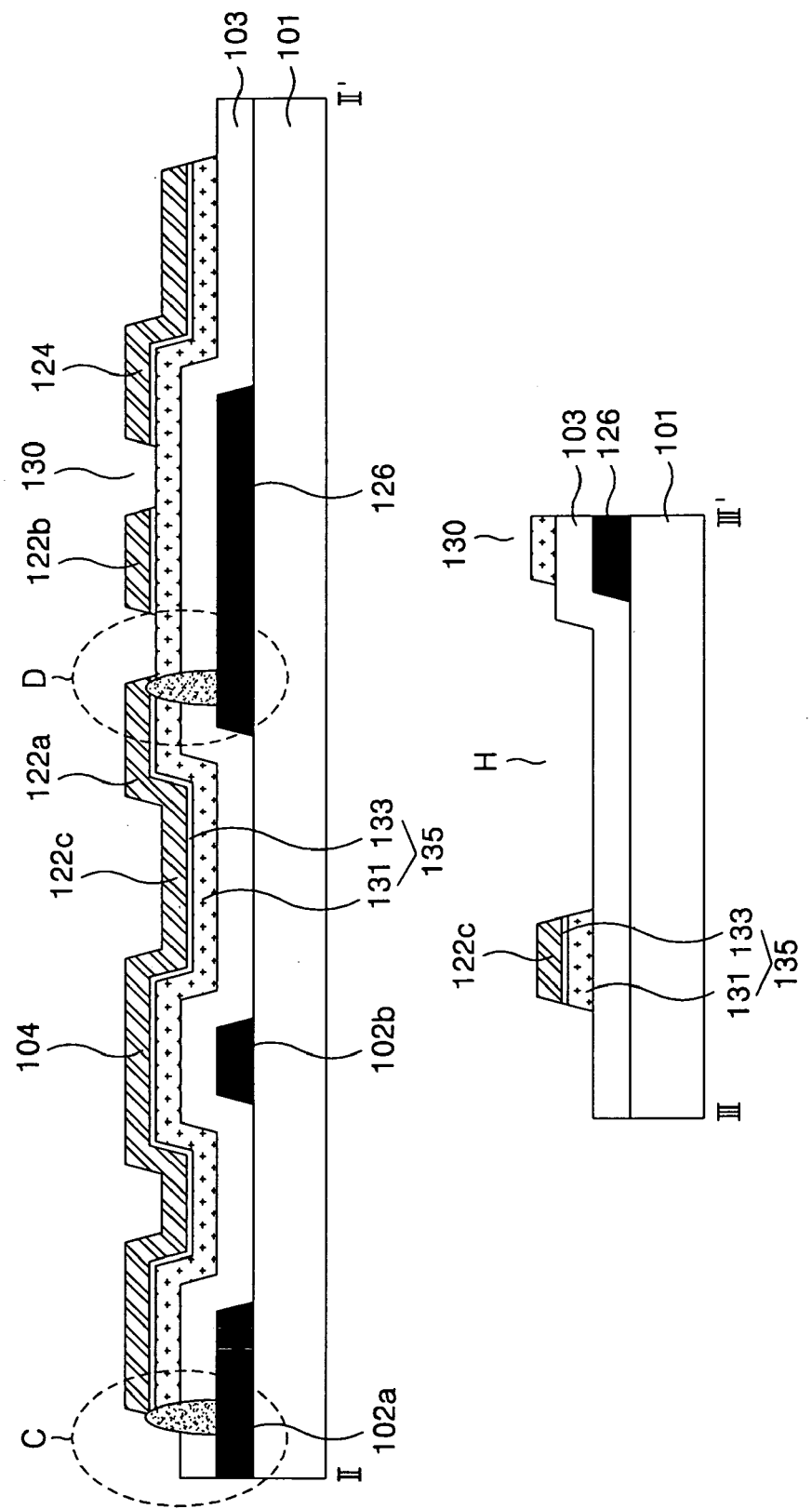

Subsequently, the photo-resist pattern 223 is ashed by an ashing process using gas plasma, thereby making a first photo-resist pattern 223a thin and a second photo-resist pattern 223b removed, as shown in FIG. 13C. And, as shown in FIG. 13C, the source/drain metal layer 217 exposed after the ashing process of the photo-resist pattern 223 and the ohmic contact layer 133 are removed by the etching process using the ashed first photo-resist pattern 223a, as shown in FIG. 13C, thereby patterning the source electrode 122 and the drain electrode 124 to form the channel part 130. The photo-resist pattern 223 like FIG. 13D is then removed through a stripping process.

Figure 14A:
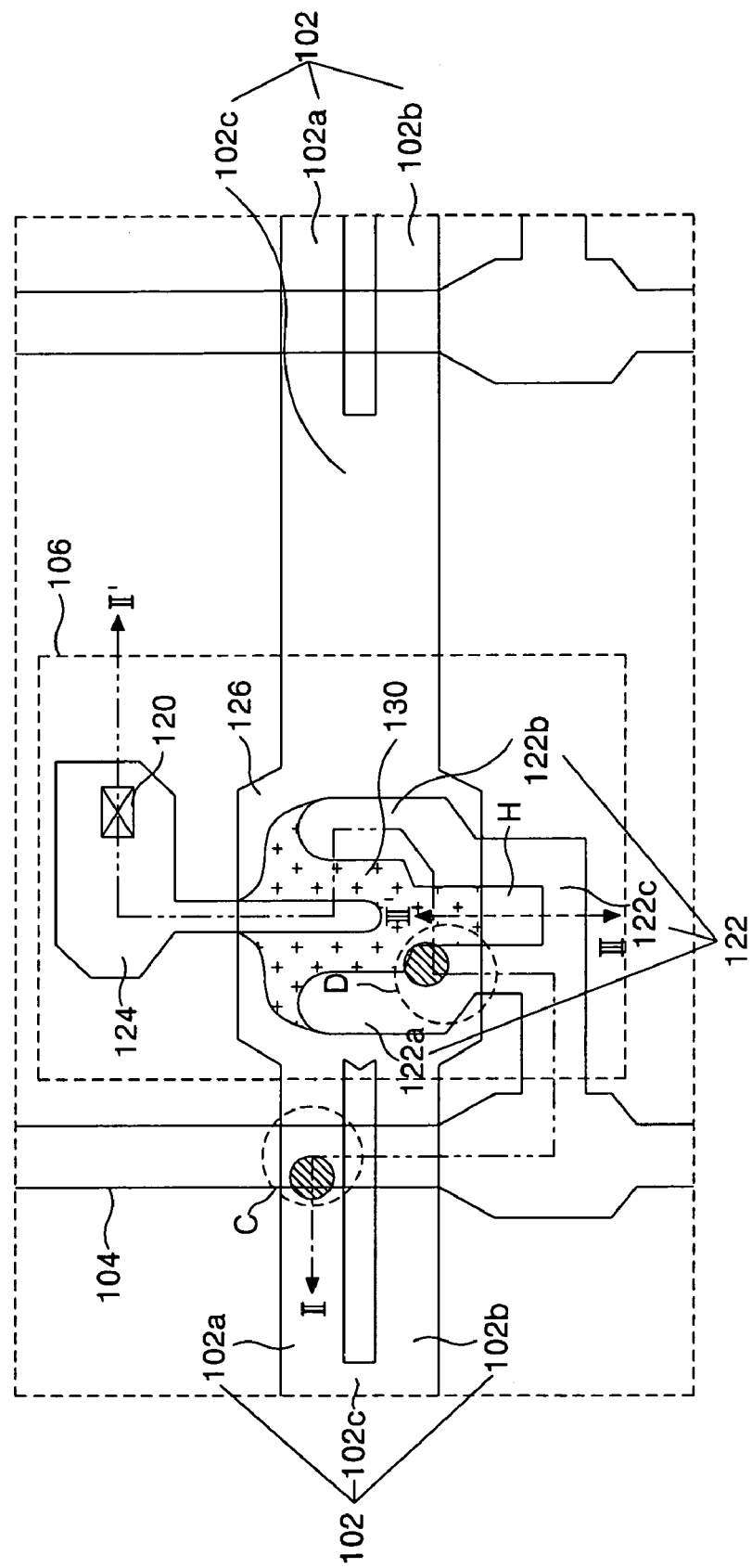
FIGS. 14A and 14B are diagrams of patterned semiconductor layer and contact hole formed by a third mask process of the thin film transistor array substrate according to a first embodiment of the present invention.
Figure 14B:
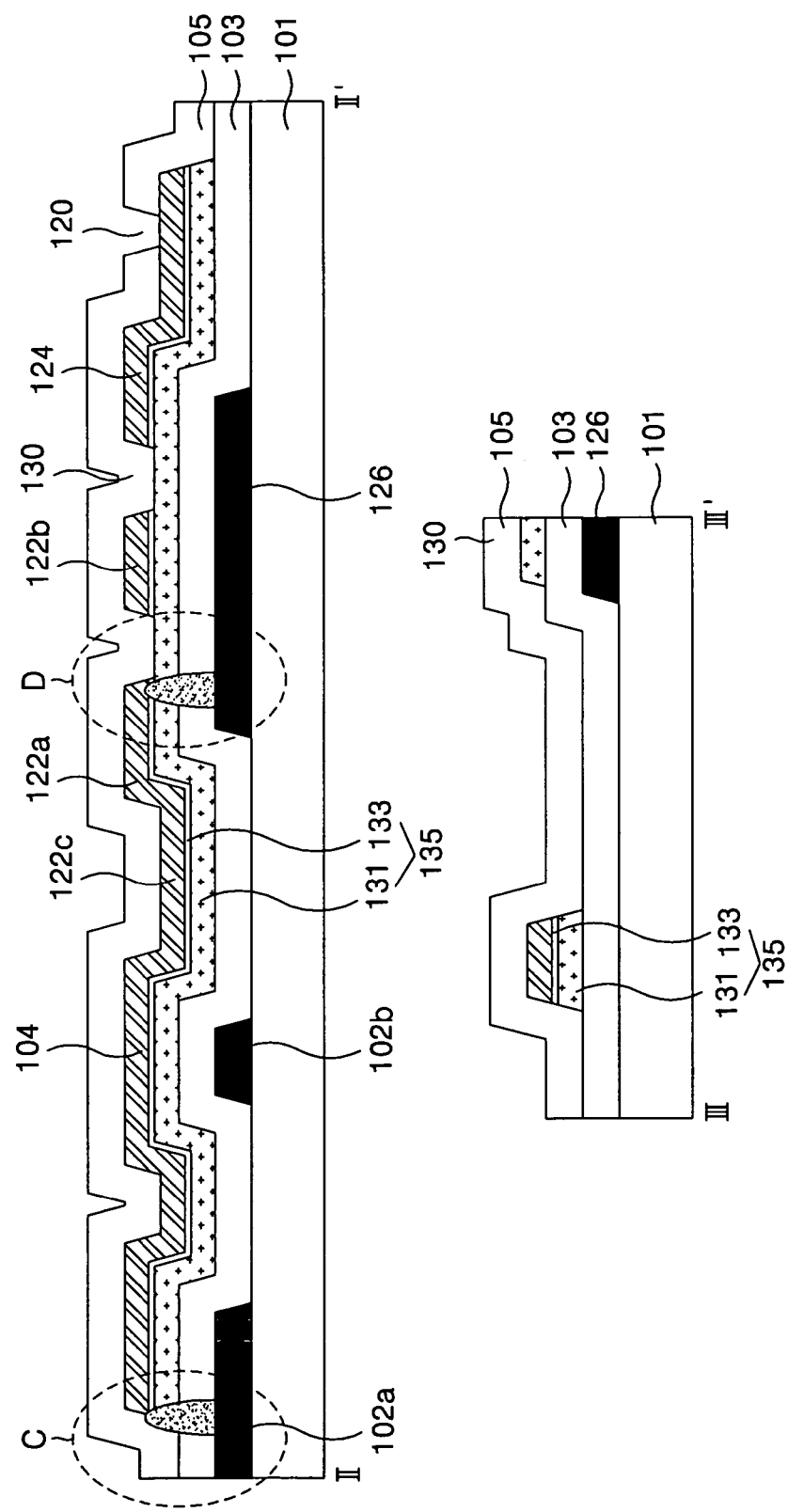

FIGS. 14A and 14B are diagrams of patterned semiconductor layer and contact hole formed by a third mask process of the thin film transistor array substrate according to a first embodiment of the present invention. As shown in FIGS. 14A and 14B, the passivation film 105 having the contact hole 120 is formed by a third mask process on the gate insulating film 103 where the second conductive pattern group, the hole opening H, and the semiconductor pattern 135 are formed.

The passivation film 105 is formed by a deposition method, such as plasma enhanced chemical vapor deposition (PECVD), on the entire surface of the gate insulating film 103 where the second conductive pattern group, the opening hole H and the semiconductor pattern 135 are formed. Subsequently, the passivation film 105 is patterned by the photolithography process and the etching process using a third mask, thereby forming the contact hole 120. The contact hole 120 penetrates the passivation film 105 to expose the drain electrode 124.

The passivation film 105 is made of an inorganic insulating material, the same material as like the gate insulating film 103, or an organic insulating material, such as acrylic organic compound with low dielectric constant, BCB or PFCB.

Figure 15A:
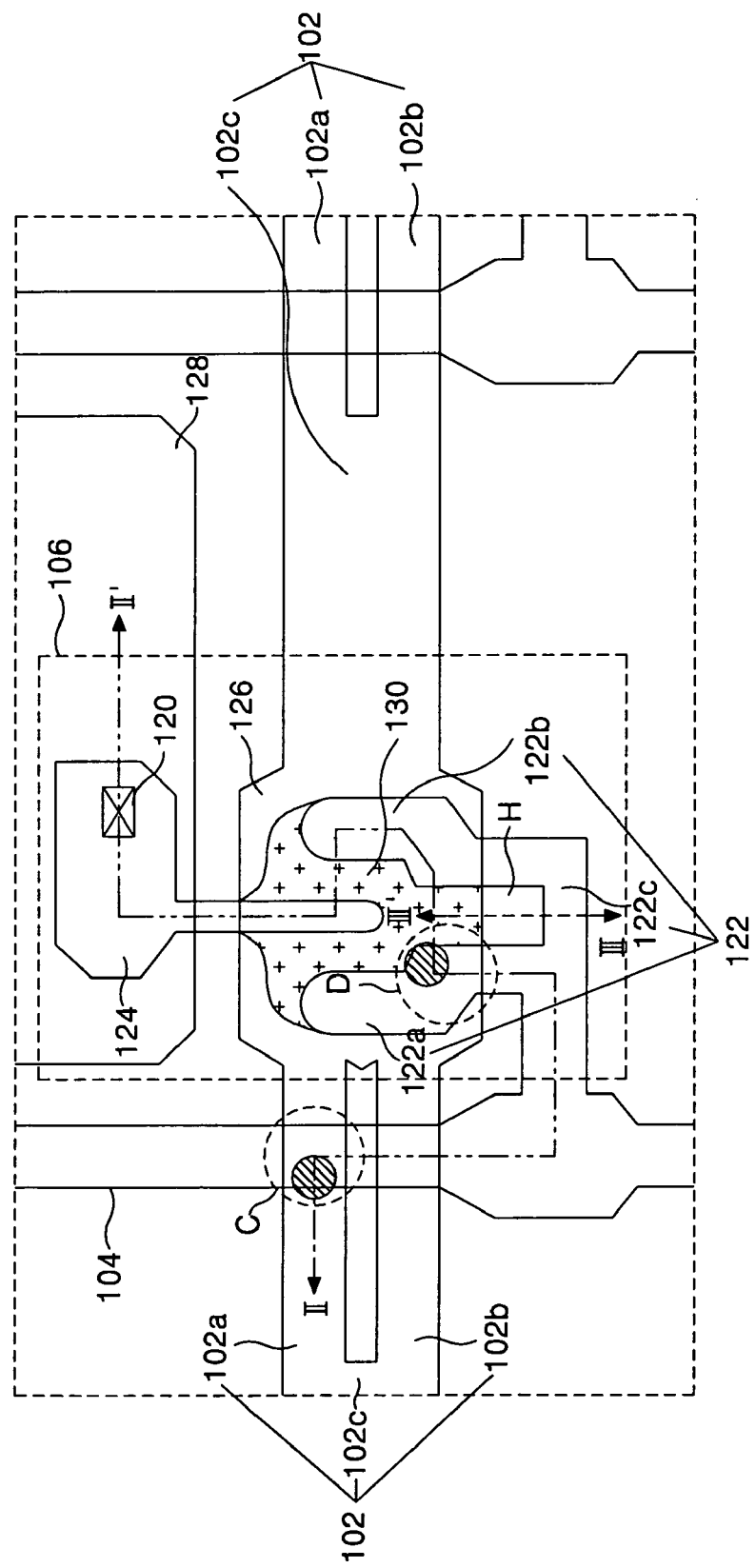

FIGS. 15A and 15B are diagrams of pixel electrode on the thin film transistor array substrate according to a first embodiment of the present invention. Referring to FIGS. 15A and 15B, the pixel electrode 128 is formed by use of a fourth mask on the passivation film inclusive of the contact hole 120. In the fourth mask process, a transparent conductive film is deposited on the passivation film 105 inclusive of the contact hole 120 by the deposition method such as sputtering. Subsequently, the transparent conductive film is patterned by the photolithography process and the etching process using the fourth mask, thereby forming the pixel electrode 128. The pixel electrode 128 is electrically connected to the drain electrode 124 through the contact hole 120. Herein, the transparent conductive film 220 is made of any one of ITO (indium tin oxide), TO (tin oxide), ITZO (indium tin zinc oxide) and IZO (indium zinc oxide).

Figure 16A:
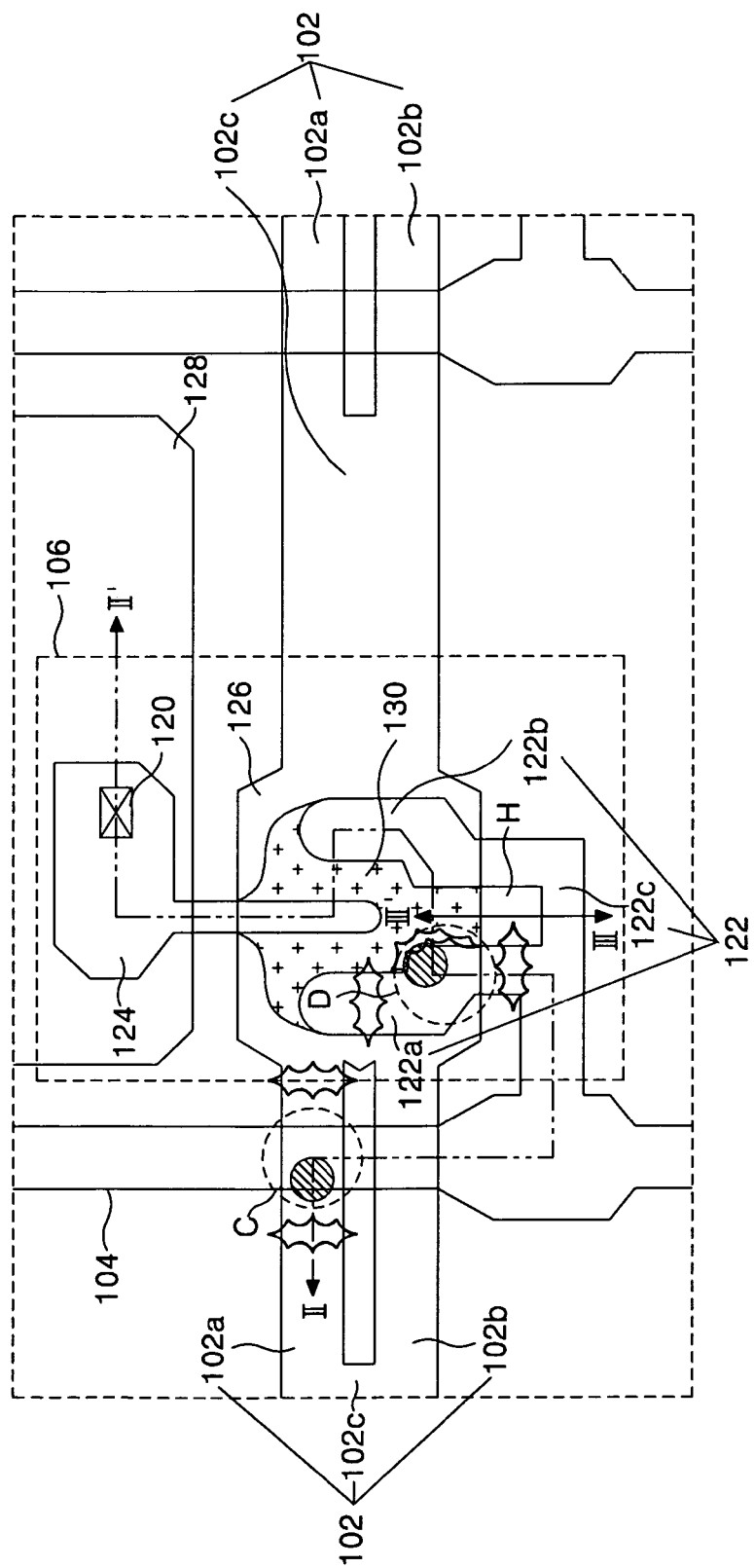
FIGS. 16A and 16B are diagrams for explaining a broken wire process of the thin film transistor array substrate according to a first embodiment of the present invention.
Figure 16B:
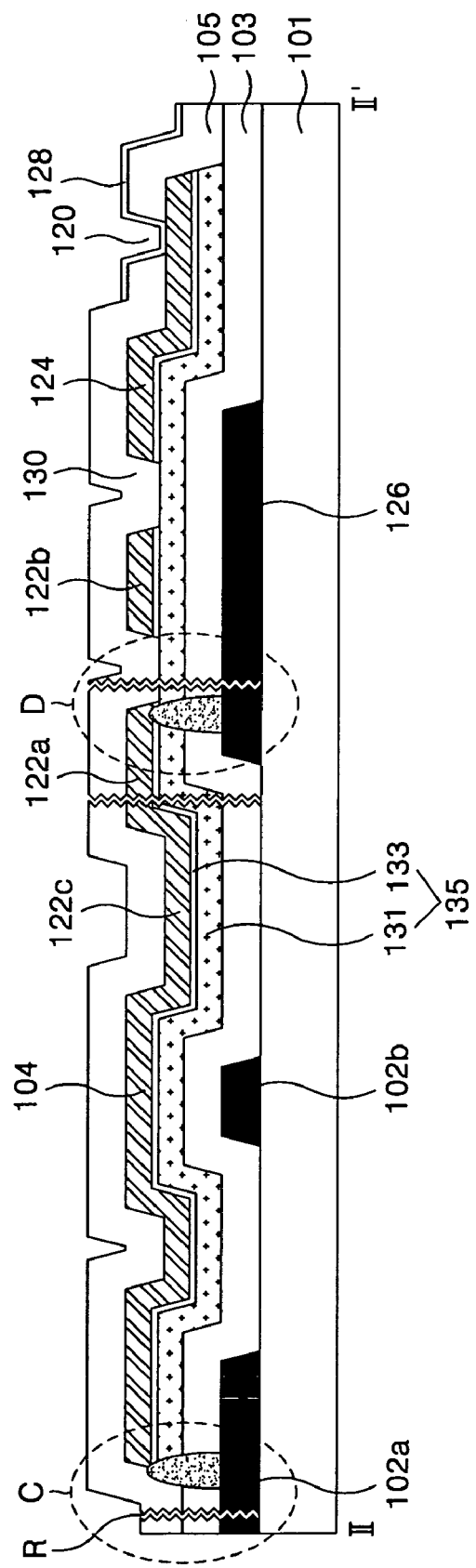

FIGS. 16A and 16B are diagrams for explaining a broken wire process of the thin film transistor array substrate according to a first embodiment of the present invention. If the wiring line forming process S1 is formed as described above, a short circuit can be by passed, as shown in pasts C and D of FIGS. 16A and 16B, after confirming the presence of the shorted wire line by the short circuit inspection process S2.

The fabricating method of the flat panel display device according to embodiments of the present invention bypasses short circuits by laser irradiation, thereby making the fabricating process of the flat panel display device simpler and the fabricating time reduced because a plurality of cleaning processes for removing the impurities after forming the gate line and the gate electrode are not required. The flat panel display device and the fabricating method thereof according to embodiments of the present invention can be applied to OLEDs and both horizontal electric field LCD devices, which control the driving of the liquid crystal by a horizontal electric field and vertical electric field LCD devices, which control the driving of the liquid crystal by a vertical electric field.

As described above, the gate line has at least two or more separated portions at an area where the gate line and the data line cross each other. The at least two or more separated portions reduces a short circuit defect ratio, which is generated between the gate line and the data line. Further, even though a short circuit occurs between the gate electrode and one of the at least two or more separated portions, the short circuit can be bypassed by laser irradiation such that a short circuit is made to have no influence over the driving of the thin film transistors along a gate line so as to prevent vertical lines.

As also described above, the source electrode according to embodiments of the present invention has first and second source electrode portions that overlap the gate electrode and are on opposite sides of the drain electrode in the thin film transistor in a pixel of an LCD panel. The source electrode has at least two or more source electrode portions that can reduce the short circuit defect ratio, which is generated between the gate electrode and the source electrode. Further, even though a short circuit occurs between the gate electrode and one of the at least two or more source electrode portions, the short circuit can be bypassed by laser irradiation such that a short circuit does not affect the thin film transistors so to maintain operation of the pixel. Embodiments of the present invention can bypass a short circuit through laser irradiation such that repair of the thin film transistor array substrate is easy. Thus, a defective thin film transistor array substrate can be repaired by laser irradiation such that manufacturing yield and productivity of the flat panel display device is increased.

Figure 17A:
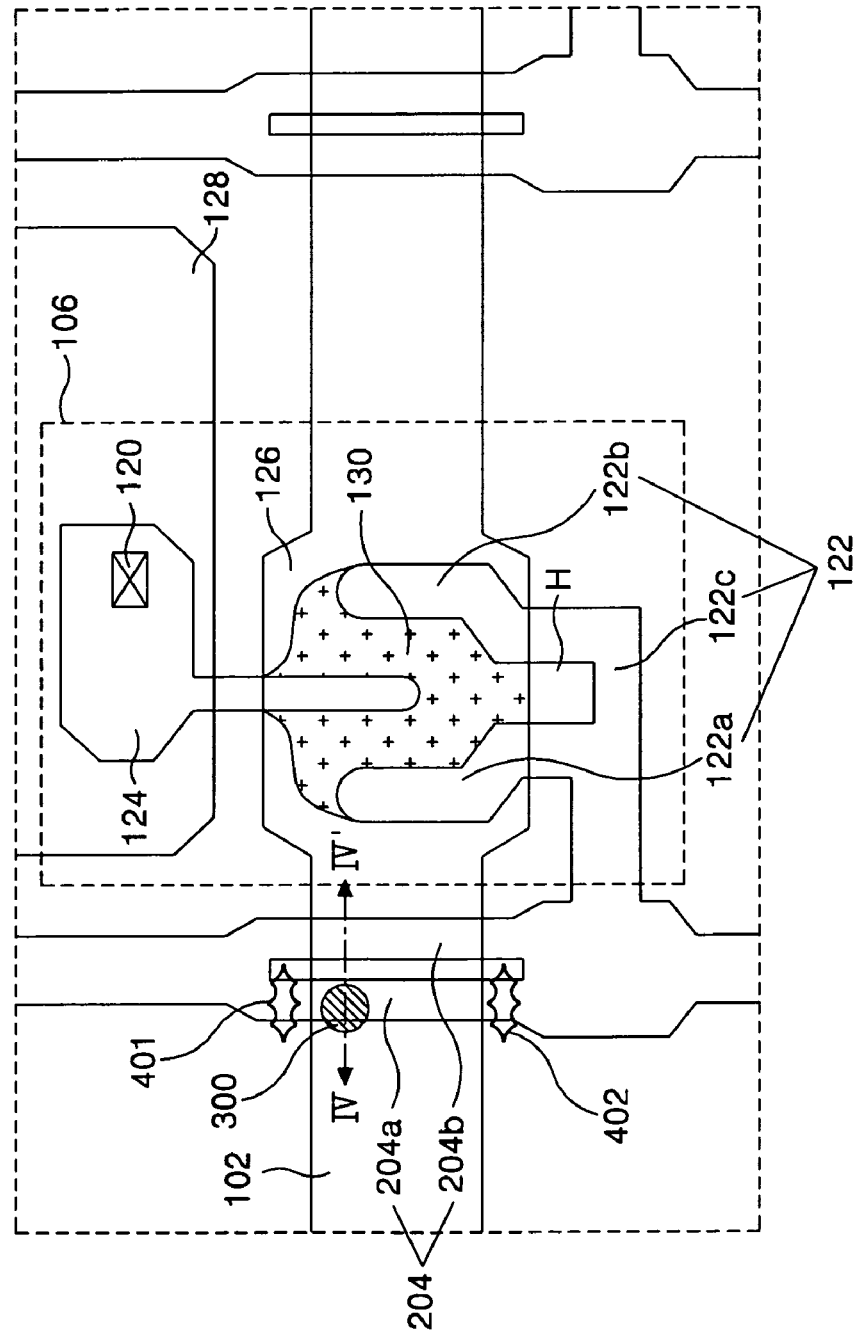
FIG. 17A is a plan view of a thin film transistor array substrate according to a second embodiment of the present invention.
Figure 17B:
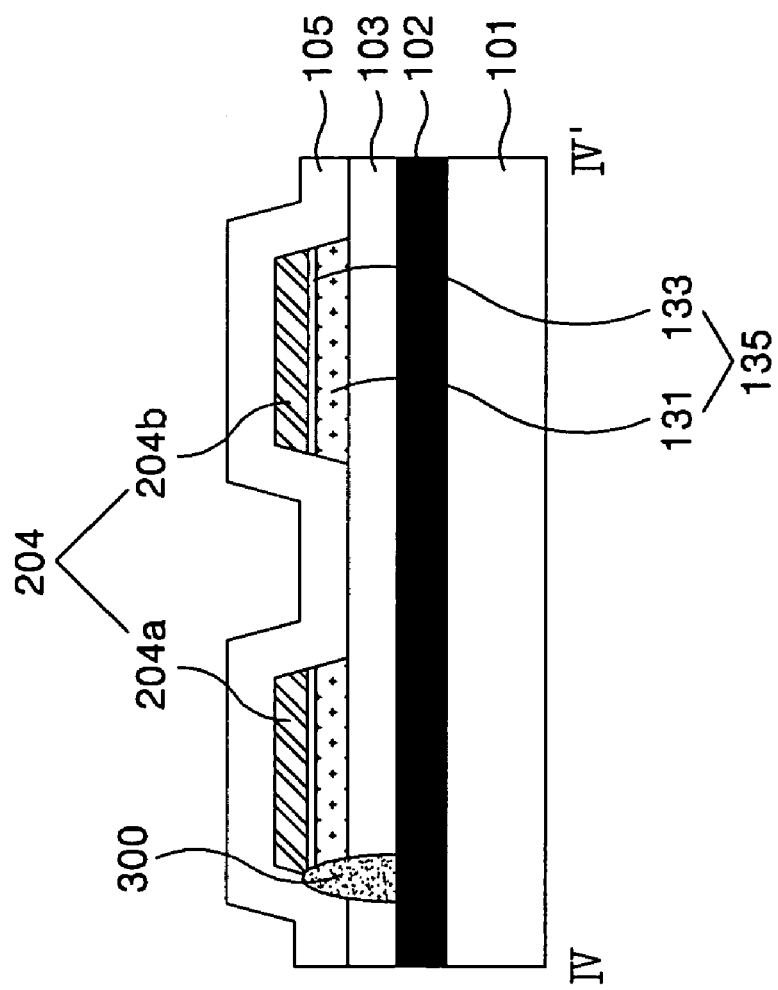
FIG. 17B is a cross-sectional view of thin film transistor array substrate shown in FIG. 17A along IV-IV'.

FIGS. 17A and 17B are a plan view and a cross-sectional view of a thin film transistor array substrate according to a second embodiment of the present invention. The elements in FIGS. 17A and 17B of the second embodiment that are the same elements as in the first embodiment will have the same reference numerals, and a detailed explanation such elements will be omitted. Referring to FIGS. 17A and 17B, a data line 204 divides into a first and second data line 204a and 204b at an area adjacent to where a data line 204 crosses a gate line 102. The first and second data line 204a and 204b cross crosses the gate line 102 and then recombine at another area adjacent to where a data line 204 crosses a gate line 102. Although the data line 204 is shown this embodiment as dividing into two data lines 204a and 204b, the data line 204 can be divided into more than two data lines.

A repairing process according to a second embodiment of the invention will be explained assuming that a conductive particle 300 is positioned so as to cause a short circuit between the first data line 104 and the gate line 102 adjacent to the crossing of the data line 204 and the gate line 102. More particularly, the repairing process of the thin film transistor array substrate in the second embodiment can include a repair of the data line 204. For example, a laser is irradiated onto the first data line 204a, which is short circuited to the gate line 102, at sections 401 and 402 that are adjacent to where a data line 204 crosses a gate line 102, to thereby electrically separate the first data line 204a from the data line 204. Accordingly, a data voltage generated from the data driver 114 can be supplied to the thin film transistor by way of the second data line 204b and the source electrode 122 without interference from the gate electrode 102.

Figure 18B:
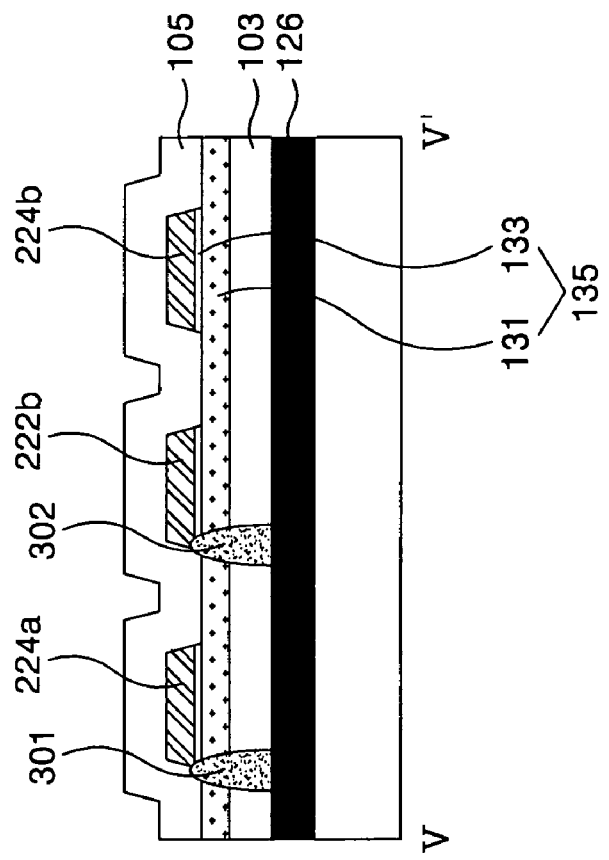
FIG. 18B is a cross-sectional view of thin film transistor array substrate shown in FIG. 18A along line V-V'.

FIGS. 18A and 18B are a plan view and a cross-sectional view representing a structure of a thin film transistor array substrate according to a third embodiment of the present invention. The elements in FIGS. 18A and 18B of the third embodiment that are the same elements as in the first embodiment will have the same reference numerals, and a detailed explanation such elements will be omitted. Referring to FIGS. 18A and 18B, a source electrode 222 of the thin film transistor 107 includes a first source electrode portion 222d positioned away from the channel of the thin film transistor 107 and second to fourth source electrode portions 222a, 222b and 222c that branch from the first source electrode portion 222d and overlap the channel. Further, a drain electrode 224 having first and second drain electrode portions 224a and 224b that overlap the gate electrode 102. Furthermore, the first and second drain electrode portions 224a and 224b are interleaved with the second to fourth source electrode portions 222a, 222b and 222c.

A repairing process will be explained assuming that a first conductive particle 301 is positioned between the first drain electrode portion 224a and the gate electrode 126 in the channel of the thin film transistor 107, and a second conductive particle 302 is positioned between the third source electrode portion 222b and the gate electrode 126 in the channel of the thin film transistor 107. More particularly, the repairing process of the thin film transistor array substrate in the third embodiment can include a repair of either or both the source electrode and the drain electrode. For example, a laser irradiates section 403 of the first drain electrode portion 224a at an area between the channel of a thin film transistor 107 and the pixel electrode 128. In addition or in the alternative, a laser irradiates section 404 of the third source electrode portion 222b at an area between the channel of the thin film transistor 126 and the first source electrode portion 222d, so that the first drain electrode portion 224a and the third source electrode portion 222b is electrically separated from the thin film transistor 107. Accordingly, after such a repairing process, when the thin film transistor is turned-on, a data voltage generated from a data driver 114 is supplied to the pixel electrode 128 by way of the data line 104 through the second and fourth source electrode portions 222a and 222c, and the second drain electrode portion 224b.

Figure 19A:
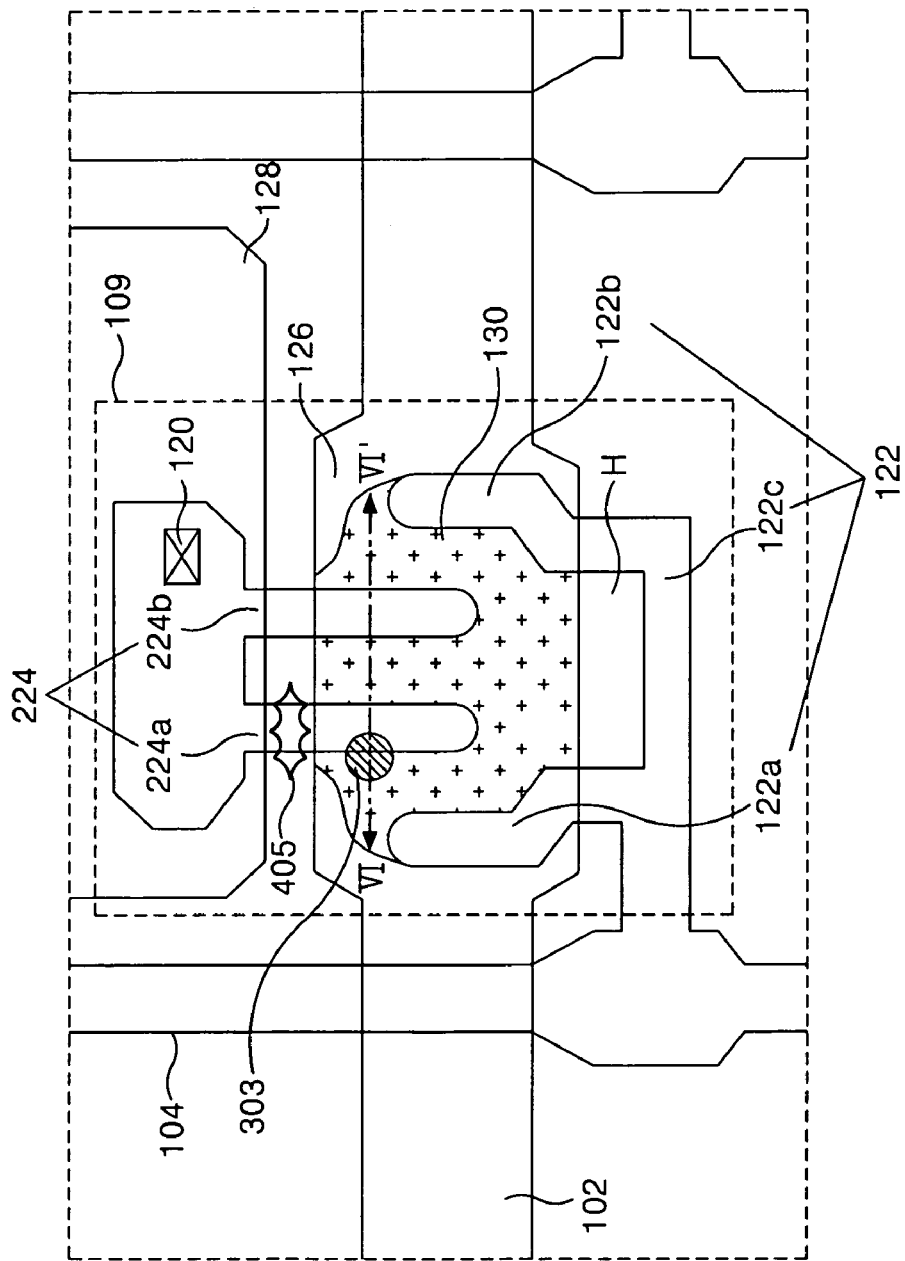
FIG. 19A is a plan view of a thin film transistor array substrate according to a fourth embodiment of the present invention.
Figure 19B:
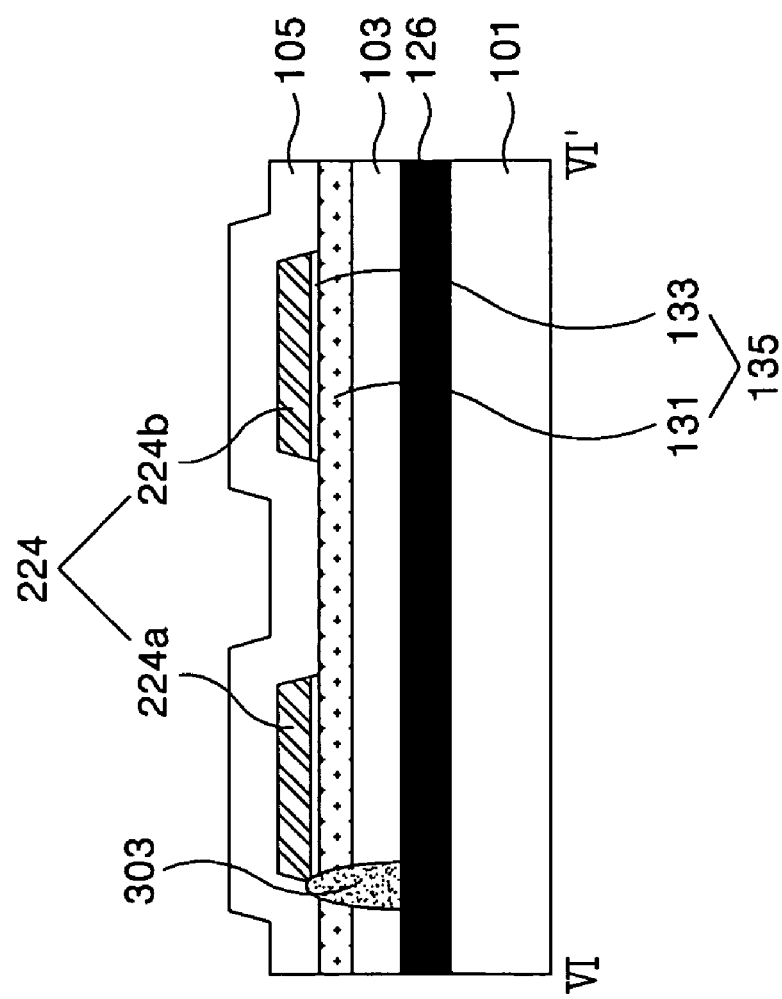
FIG. 19B is a cross-sectional view of thin film transistor array substrate shown in FIG. 19A along line VI-VI'.

FIGS. 19A and 19B are a plan view and a cross-sectional view of a thin film transistor array substrate according to a fourth embodiment of the present invention. The elements in FIGS. 19A and 19B of the fourth embodiment that are the same elements as in the first embodiment will have the same reference numerals, and a detailed explanation such elements will be omitted. Referring to FIGS. 19A and 19B, a source electrode 122 of the thin film transistor 106 includes a first source electrode portion 222c positioned away from the channel of the thin film transistor 109 and second to third source electrode portions 122a and 122b that branch from the first source electrode portion 222c and overlap the channel of the thin film transistor 109. In other words, the second source electrode portion 122a is arranged at one edge of the semiconductor layer of the thin film transistor while the third source electrode 122b is arranged at another edge of the semiconductor layer of the thin film transistor 109. Further, the drain electrode 224 has first and second drain electrode portions 224a and 224b that overlaps the gate electrode 102. The first and second drain electrode portions 224a and 224b are both positioned between the second and third source electrode portions 122a and 122b, and commonly connected to the pixel electrode 102.

A repairing process will be explained assuming that a conductive particle 303 is positioned between the first drain electrode 224a and the gate electrode 126 in the channel of the thin film transistor 109. More particularly, the repairing process of the thin film transistor array substrate in the third embodiment can include a repair of the drain electrode. For example, a laser irradiates section 405 of the first drain electrode portion 224a at an area between the channel of a thin film transistor 109 and the pixel electrode 128, so that the first drain electrode 224a is electrically separated from the thin film transistor 109. The section 405 of the first drain electrode portion 224a does not overlap the semiconductor layer of the thin film transistor 109 or the gate electrode 126. Accordingly, after the repairing process, when the thin film transistor is turned-on, a data voltage generated from a data driver 114 is supplied to the pixel electrode 128 by way of the data line 104, the second source electrode portion 122b, the third electrode portion 122c, and the second drain electrode portion 224b.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A flat panel display device, comprising:
    a gate line and a data line crossing each other to define a pixel area;
    a pixel electrode in the pixel area;
    a thin film transistor having a gate electrode connected to the gate line, a source electrode connected to the data line, a drain electrode connected to the pixel electrode;
    a gate insulating film disposed on the gate line and the gate electrode; and
    an active layer and an ohmic contact layer sequentially disposed on the gate insulating film,
    wherein the gate line has at least two or more separated gate line portions at a crossing region where the gate line crosses the data line, the at least two or more separated gate line portions overlapping the data line at the crossing region, and the source electrode of the thin film transistor has at least two separated source electrode portions extending from another source electrode portion toward a channel part of the thin film transistor,
    wherein the two or more separated gate line portions are connected to another gate line portion and the gate electrode; and
    wherein the two or more separated gate line portions have the same length between the another gate line portion and the gate electrode.

2. The flat panel display device according to claim 1, wherein the gate line and the gate electrode include at least one of an aluminum containing metal, copper, chromium, and neodymium.

3. The flat panel display device according to claim 1, wherein when one of the gate line portions is shorted to the data line, and the shorted gate line portion is electrically disconnected from the data line.

4. The flat panel display device according to claim 1, wherein the at least two separated source electrode portions overlap the gate electrode adjacent to the channel of the thin film transistor.

5. The flat panel display device according to claim 1, wherein when one of the source electrode portions is shorted to the gate electrode, the shorted source electrode portion is electrically disconnected from the gate electrode.

6. A fabricating method of a flat panel display device, comprising:
    forming a first conductive pattern group with a gate line having two or more separated gate line portions and a gate electrode on a substrate;
    forming a gate insulating film to cover the first conductive pattern group;
    an active layer and an ohmic contact layer sequentially disposed on the gate insulating film;
    forming thin film transistors having a channel on the active layer and the ohmic contact layer and a second conductive pattern, which includes a data line crossing the separated gate line portions, at least two separated source electrode portions extending from another source electrode portion toward the channel, and a drain electrode positioned between the at least two separated source electrode portions;
    forming a passivation film that covers the thin film transistors;
    forming a first contact hole in the passivation film to expose the drain electrode; and
    forming a pixel electrode connected to the drain electrode through the first contact hole,
    wherein the two or more separated gate line portions overlap the data line at a crossing region where the gate line crosses the data line,
    wherein the two or more separated gate line portions are connected to another gate line portion and the gate electrode; and
    wherein the two or more separated gate line portions have the same length between the another gate line portion and the gate electrode.

7. The fabricating method according to claim 6, wherein the first conductive pattern group is formed of made of one of an aluminum containing metal, copper, chromium, and neodymium.

8. The fabricating method according to claim 6, further comprising the step of
    performing a short circuit inspection to determine if there is a short circuit either between the data line and one of the separated gate line portions or between the gate electrode and one of the separated source electrode portions.

9. The fabricating method according to claim 8, further comprising the step of
    disconnecting a short circuited portion by irradiating a laser onto the source electrode portion that is shorted with the gate electrode or the gate line portion that is shorted with the data line.

* * * * *